(12) United States Patent
Srinivasachar et al.

(10) Patent No.: US 8,069,797 B2
(45) Date of Patent: Dec. 6, 2011

(54) CONTROL OF MERCURY EMISSIONS FROM SOLID FUEL COMBUSTION

(75) Inventors: Srivats Srinivasachar, Sturbridge, MA (US); Shin G. Kang, Simsbury, CT (US); Kurt W. Johnson, East Windsor, CT (US)

(73) Assignee: ALSTOM Technology Ltd. (CH)

( * ) Notice: Subject to any disclaimer, the term of this patent is extended or adjusted under 35 U.S.C. 154(b) by 964 days.

(21) Appl. No.: 10/961,697

(22) Filed: Oct. 8, 2004

(65) Prior Publication Data
US 2005/0039598 A1 Feb. 24, 2005

Related U.S. Application Data

(63) Continuation-in-part of application No. 10/453,140, filed on Jun. 3, 2003, now Pat. No. 6,848,374.

(51) Int. Cl.
*F23J 11/00* (2006.01)
(52) U.S. Cl. ........................ 110/345; 110/342
(58) Field of Classification Search .................. 110/342, 110/344, 345
See application file for complete search history.

(56) References Cited

U.S. PATENT DOCUMENTS

| | | | |
|---|---|---|---|
| 3,961,020 A | 6/1976 | Seki | |
| 4,889,698 A | 12/1989 | Moller et al. | |
| 5,435,980 A | 7/1995 | Felsvang et al. | |
| 5,505,766 A | 4/1996 | Chang | |
| 5,569,436 A * | 10/1996 | Lerner | 422/170 |
| 5,672,323 A | 9/1997 | Bhat et al. | |
| 5,854,173 A | 12/1998 | Chang et al. | |
| 6,027,551 A | 2/2000 | Hwang et al. | |
| 6,451,094 B1 | 9/2002 | Chang et al. | |
| 6,521,021 B1 * | 2/2003 | Pennline et al. | 95/134 |
| 6,558,454 B1 * | 5/2003 | Chang et al. | 95/901 |
| 6,818,043 B1 | 11/2004 | Chang et al. | |
| 6,878,358 B2 | 4/2005 | Vosteen et al. | |
| 2003/0206843 A1 | 11/2003 | Nelson, Jr. | |
| 2004/0003716 A1 | 1/2004 | Nelson, Jr. | |

FOREIGN PATENT DOCUMENTS

| | | |
|---|---|---|
| EP | 0 253 563 | 1/1988 |
| EP | 1 275 430 | 1/2003 |
| WO | WO 93/20926 | 10/1993 |
| WO | WO 2004/108254 | 12/2004 |

OTHER PUBLICATIONS

European Search Report for EP Application No. 05021227.3-2113 dated Feb. 17, 2006.
Todd R. Carey: "Assessing Sorbent Injection Mercury Control Effectiveness in Flue Gas Streams"—Environmental Progress, American Institute of Chemical Engineers, US vol. 19, No. 3, 2000, pp. 167-174,—the whole document.

* cited by examiner

*Primary Examiner* — Kenneth Rinehart
(74) *Attorney, Agent, or Firm* — Michaud-Kinney Group LLP

(57) ABSTRACT

A system 26 for removing elemental mercury or mercury compounds handles carbonaceous sorbent 28 of a starter batch stored in a silo 30 in an agglomerated state. The sorbent 28 is fed by a feeder 32 to a separation device 34, which comminutes (if necessary) and de-agglomerates the sorbent particles 28 to their primary size distribution. This device 34 may be a particle-particle separator or a jet mill, where compressed air or high-pressure steam is the energy source. The de-agglomerated sorbent 28 of a contact batch created from the starter batch is conveyed by an airsteam for injection at a contact location 66 in a flue gas duct whereat carbonaceous sorbent of the contact batch adsorbs mercury from the flue gas.

22 Claims, 19 Drawing Sheets

Effect of Particle Size and Iodine Treatment on Mercury Capture

Effect of Dispersion on In-situ Particle Size Distribution

CONTROL OF MERCURY EMISSIONS FROM SOLID FUEL COMBUSTION

This application is a continuation-in-part of U.S. patent application Ser. No. 10/453,140, filed Jun. 3, 2003 now U.S. Pat. No. 6,848,374 and benefit to this earlier filed U.S. patent application is claimed under 35 U.S.C. 120.

BACKGROUND OF THE INVENTION

The present invention relates to apparatus and a method for removing mercury from the products of solid fuel combustion including flue gases and more particularly to apparatus and a method for removing elemental mercury or mercury compounds from the flue gases from coal combustion.

The use of activated carbon for the adsorption of mercury vapor has been successfully demonstrated in various applications such as municipal waste incineration. However, there are significant differences in the concentration of mercury from waste incinerators compared to coal-fired power plants with the concentration from the coal-fired power plants being anywhere from 10 to 100 times lower. Also, the mercury from waste incinerators is usually in the form of mercury chloride whereas the mercury from coal-fired power plants is usually in the form of elemental mercury. Both of these differences make it more difficult to remove the mercury from the flue gas from a coal-fired power plant.

The utilization factor for activated carbon is limited by the relatively large particle size and low surface area which limits the adsorption of mercury. Using activated carbon with mean particle size of about 5 microns with a top size of about 10 microns would improve the mercury capture efficiency, but storage, handling, transport and dispersion of these articles is extremely difficult. As a result, the use of activated carbon for mercury capture in coal-fired power plants is too costly. In such applications, the utilization of the activated carbon is quite low with a minimum mole ratio of carbon to mercury of 10,000 to 1.

Another form of carbon which has been proposed for the capture of mercury from flue gases is carbon black. Carbon black is a finely divided form of carbon produced by the incomplete combustion or thermal decomposition of a hydrocarbon fuel. The most common form of carbon black is referred to as furnace black or soot which is made by burning natural gas or petroleum oil in a closed furnace with about 50% of the air required for complete combustion. The external surface area of the carbon black is about 100 times that of activated carbon. This could result in a significant decrease of the C/Hg mole ratio for effective mercury capture compared to activated carbon. As the market price for carbon black is similar to that for activated carbon, there is the potential for a significant cost reduction.

Carbon black generation for the capture of mercury from a refuse incinerator is disclosed in the International Patent Application PCT/SE93/00163 (International Publication Number WO 93/20926). This is characterized by the burning of a fuel with a deficiency of oxygen in a separate incinerator and injecting the soot-laden flue gas into the flue gas from the refuse incinerator. However, oxygen deficient combustion leads to the generation of other pollutants such as carbon monoxide and unburned hydrocarbons. Even if the flue gas from the carbon black generator were to be injected upstream of an acid gas removal device such as a flue gas scrubber, the carbon monoxide and unburned hydrocarbons would not be destroyed or removed.

Another problem with the application of prior art carbon black and activated carbon-based methods for mercury capture from incinerators to the capture of mercury from coal-fired power plants is that refuse incinerators have high chlorine levels and the mercury is present in the flue gas predominantly as mercury chloride as previously stated. In coal-fired power plants, the mercury is usually elemental. Although carbon black and activated carbon have a relatively high affinity for the adsorption of mercuric chloride, they have a relatively lower affinity for the adsorption of elemental mercury.

Carbon-based sorbents such as activated carbon have been proposed for controlling vapor phase mercury emissions in power plant flue gases. In a conventional method, carbon sorbents are injected in the flue gas duct upstream of particulate removal device such as baghouses and electrostatic precipitators and downstream of air heaters.

The temperature of the location at which carbon sorbents are injected has heretofore been taken into consideration for the reason that it has been suggested that the adsorption capacity of mercury on carbon sorbents is higher at relatively lower temperatures. In this connection, it is also known in the art that physical adsorption (physisorption) of mercury on carbon is reduced with temperature. Consequently, the prior art essentially does not provide any detailed information concerning the desirability of injecting, for the purpose of capturing mercury from gas streams, carbonaceous sorbents at relatively higher temperatures such as, for example, temperatures above about 400° F.

It is also known in the art that vapor phase mercury in the flue gas emerging from the high temperature boiler is in the form of elemental mercury. Oxidation of elemental mercury to oxidized mercury ($Hg^{2+}$) is beneficial to mercury control since it can be removed more easily by carbonaceous material.

The injection of activated carbon into the flue gas may typically lead to a presence of, or an increase in, carbon in the fly ash, whereupon an amount of carbon in the fly ash above a prescribed limit may prevent the use of this fly ash for the purpose, for example, of concrete manufacturing. The activated carbon, because of its hydrophobic nature, adsorbs air-entraining additives that are used in the concrete formulation. Also due to activated carbon, the fly ash changes its color to dark grey to black. One way of minimizing this air entrainment impact is to oxidize the carbon, making it more hydrophilic. Another way to make the carbon hydrophilic is by impregnating the carbonaceous sorbent with additives that are hydrophilic, e.g., halide salts such as iron chloride. Still another way of minimizing this problem is to reduce the usage of carbon sorbent below a level that impacts air entrainment behavior and discoloration.

SUMMARY OF THE INVENTION

An object of the present invention is to provide a method for the capture of mercury from a coal-fired power plant with carbonaceous sorbent without emitting pollutants generated in the production of the carbonaceous sorbent. The invention involves producing the carbonaceous sorbent and eliminating pollutants which may be generated during its production. The invention also may involve the treatment of the carbonaceous sorbent to enhance the capture of elemental mercury.

In accordance with one aspect of the present invention, there is provided an apparatus for removing mercury from the products of fuel conversion which includes means for separating a starter batch of carbonaceous sorbent into a contact batch of carbonaceous sorbent and a retained batch of carbonaceous sorbent, the contact batch of carbonaceous sorbent having a particle size distribution of carbonaceous sorbent of $d_{50}$<15 microns, where $d_{50}$ represents 50% of the particles by mass in the entire distribution in the contact batch with the particle size distribution of carbonaceous sorbent in the contact batch after separation being less than the particle size distribution of carbonaceous sorbent in the starter batch before separation and less than the particle size distribution of carbonaceous sorbent in the retained batch, and means for disposing the contact batch of carbonaceous sorbent into contact with the products of fuel conversion at a contact location such that the carbonaceous sorbent of the contact batch adsorbs mercury.

Additionally, in the one aspect of the present invention, the apparatus further includes transport means for transporting carbonaceous sorbent of the contact batch to the contact location in a manner in which, on average, at least ninety percent (90%) of the carbonaceous sorbent of the contact batch is delivered to the contact location in less than thirty (30) minutes following the conversion of the carbonaceous sorbent of the starter batch into the carbonaceous sorbent of the contact batch and the carbonaceous sorbent of the retained batch, whereby the carbonaceous sorbent of the contact batch is disposed into contact with the products of fuel conversion at the contact location with substantially no intermediate storage of the carbonaceous sorbent following the conversion of the carbonaceous sorbent of the starter batch into the carbonaceous sorbent of the contact batch and the carbonaceous sorbent of the retained batch. Also, the apparatus preferably includes means for separating carbonaceous sorbent which has absorbed mercury from the products of fuel conversion.

With regard to a further feature of the apparatus of the present invention, the means for separating a starter batch of carbonaceous sorbent includes particle size reducing means for reducing the particle size of carbonaceous sorbent from a relatively larger coarse particle size to a relatively smaller fine particle size. With regard to another further feature of the apparatus of the present invention, the means for separating a starter batch of carbonaceous sorbent is operable to create a contact batch of carbonaceous sorbent having a primary particle size distribution of carbonaceous sorbent of $d_{50}$<8 microns, where $d_{50}$ represents 50% of the particles by mass in the entire distribution in the contact batch.

Alternatively, with regard to yet another further feature of the apparatus of the present invention, the means for separating a starter batch of carbonaceous sorbent is operable to create a contact batch of carbonaceous sorbent having a primary particle size distribution of carbonaceous sorbent of $d_{50}$<4 microns, where $d_{50}$ represents 50% of the particles by mass in the entire distribution in the contact batch.

With regard to an additional feature of the apparatus of the present invention, the apparatus also includes means for depositing at least one of a halogen species and an acidic species on the carbonaceous sorbent of the contact batch prior to disposing the carbonaceous sorbent of the contact batch into contact with the products of fuel conversion.

With regard to a desirable feature of the apparatus of the present invention, the median particle size distribution ($d_{50}$) of the contact batch, representing 50% of the particles by mass in the entire distribution in the contact batch, is no more than one-half (½) of the median particle size distribution ($d_{50}$) of the starter batch representing 50% of the particles by mass in the entire distribution in the starter batch.

In regard to the use of the apparatus of the present invention, the products of fuel conversion can include fly ash generated by the combustion of coal and the means for separating carbonaceous sorbent which has absorbed mercury from the products of fuel conversion preferably includes a classifier capable of separating carbonaceous sorbent from relatively coarser and denser fly ash. With further regard to the use of the apparatus of the present invention, the products of fuel conversion can include flue gases generated by the combustion of coal and the carbonaceous sorbent adsorbs at least one of elemental mercury and mercury compounds from the flue gases.

Preferably, the transport means for transporting carbonaceous sorbent of the contact batch to the contact location is operable to transport the carbonaceous sorbent of the contact batch in a manner in which, on average, at least ninety percent (90%) of the carbonaceous sorbent of the contact batch is delivered to the contact location in less than five (5) minutes following the conversion of the carbonaceous sorbent of the starter batch into the carbonaceous sorbent of the contact batch and the carbonaceous sorbent of the retained batch. Even more preferably, the transport means for transporting carbonaceous sorbent of the contact batch to the contact location is operable to transport the carbonaceous sorbent of the contact batch in a manner in which, on average, at least ninety percent (90%) of the carbonaceous sorbent of the contact batch is delivered to the contact location in less than one (1) minute following the conversion of the carbonaceous sorbent of the starter batch into the carbonaceous sorbent of the contact batch and the carbonaceous sorbent of the retained batch.

In accordance with another aspect of the present invention, there is provided a method for removing mercury from the products of fuel conversion including the steps of separating a starter batch of carbonaceous sorbent into a contact batch of carbonaceous sorbent and a retained batch of carbonaceous sorbent, the contact batch of carbonaceous sorbent having a particle size distribution of carbonaceous sorbent of $d_{50}$<15 microns, where $d_{50}$ represents 50% of the particles by mass in the entire distribution in the contact batch with the particle size distribution of carbonaceous sorbent in the contact batch after separation being less than the particle size distribution of carbonaceous sorbent in the starter batch before separation and less than the particle size distribution of carbonaceous sorbent in the retained batch, and disposing the contact batch of carbonaceous sorbent into contact with the products of fuel conversion at a contact location such that the carbonaceous sorbent of the contact batch adsorbs mercury. The method of the present invention further includes transporting carbonaceous sorbent of the contact batch to the contact location in a manner in which, on average, at least ninety percent (90%) of the carbonaceous sorbent of the contact batch is delivered to the contact location in less than thirty (30) minutes following the conversion of the carbonaceous sorbent of the starter batch into the carbonaceous sorbent of the contact batch and the carbonaceous sorbent of the retained batch, whereby the carbonaceous sorbent of the contact batch is disposed into contact with the products of fuel conversion at the contact location with substantially no intermediate storage of the carbonaceous sorbent following the conversion of the carbonaceous sorbent of the starter batch into the carbonaceous sorbent of the contact batch and the carbonaceous sorbent of the retained batch. Additionally, the method of the present invention includes separating carbonaceous sorbent which has absorbed mercury from the products of fuel conversion.

The present invention exploits the recognition that carbon sorbents may also be used to effect chemisorption of mercury onto their surfaces. Contrary to physisorption, the extent of chemisorption tends to increase with temperature and the present invention thus provides a process for exploiting the adsorption (both chemisorption and physisorption) of mercury takes place at a wider temperature range of 100° F. to 800° F.

Equilibrium calculations of potential mercury species present in coal combustion flue gases show lower temperatures favor more complete conversion to oxidized mercury. However, the present invention has led to the recognition that kinetics of oxidation is not favored as the flue gas is cooled, even though equilibrium would indicate complete oxidation as well as the recognition that oxidized mercury species ($HgCl_2$) already begin to form at temperatures lower than about 600° C. (873 K) from elemental mercury. In accordance with this recognition that higher temperatures will favor kinetics of this transformation, the process of the present invention utilizes the entire temperature range of 300 to 1,000° F. to oxidize and capture mercury.

An object of the present invention is to reduce consumption of carbon sorbent for both fabric filters and, in particular, electrostatic precipitators for a prescribed degree of vapor phase mercury removal.

Another object of the present invention is to increase the oxidation degree of vapor phase mercury and decrease the amount of vapor phase elemental mercury.

A further object of the present invention is to minimize the impact of carbon sorbent injection on the utilization of fly ash.

In accordance with one aspect of the present invention, there is provided a method of preparing proprietary sorbents from activated carbon and injecting them at locations that maximize oxidation/capture kinetics and that minimize contamination of fly ash stream with sorbent.

Other objects and advantages of the invention will become apparent from the drawings and specification.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENT

Figure 1:
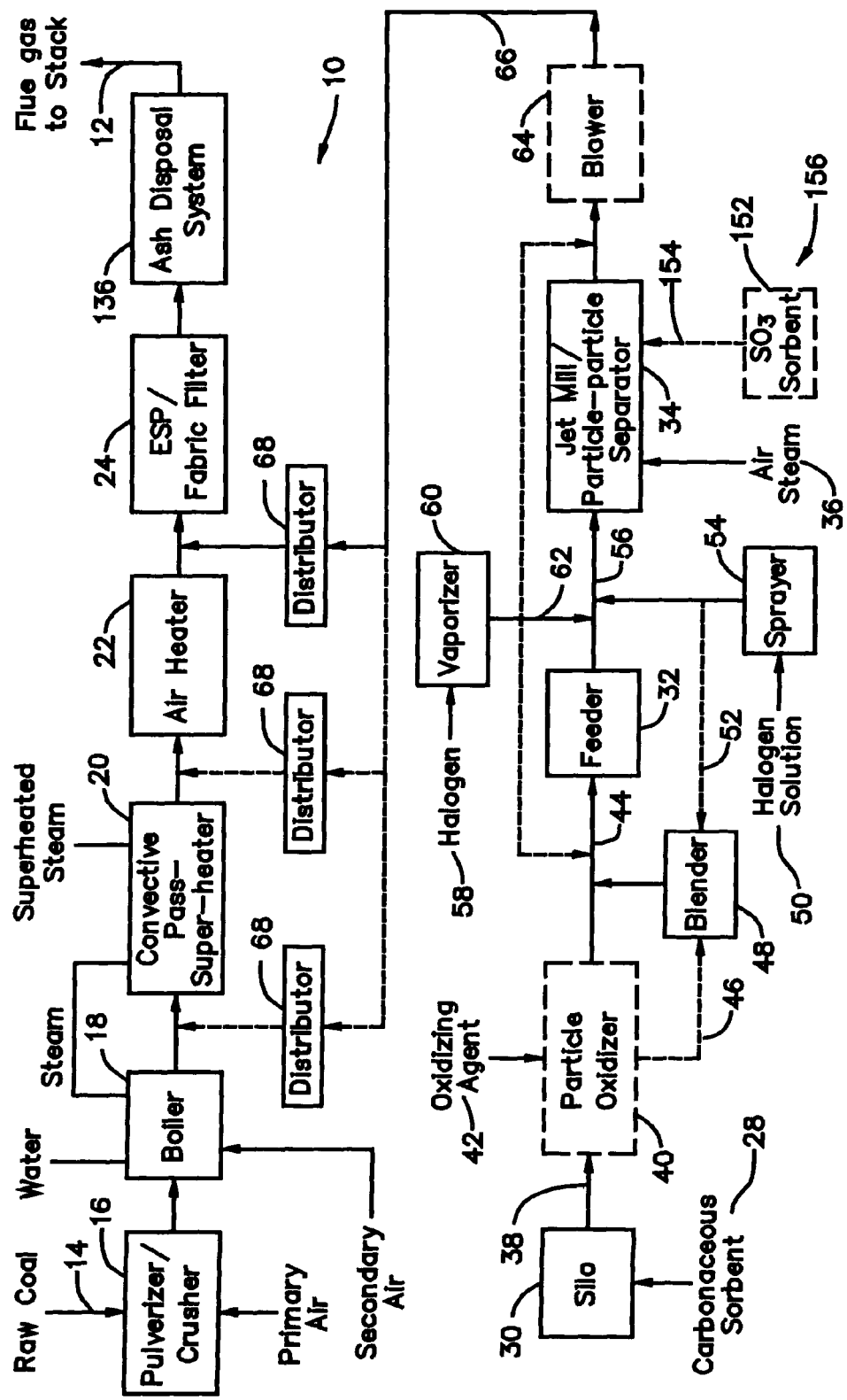
FIG. 1 is a schematic diagram of a first embodiment of a system in accordance with the present invention for removing elemental mercury or mercury compounds from the flue gases from coal combustion.

With reference to FIG. 1, there is illustrated therein an exemplary fuel conversion arrangement for converting a fuel—namely, a solid fossil fuel in the form of coal—into a desired energy form. The exemplary fuel conversion arrangement illustrated in FIG. 1 effects the fuel conversion via combustion of coal and is illustratively configured as a typical 100 MWe coal firing plant 10 which combusts approximately 40 tons/hr of coal with a flue gas flow 12 of about 350,000 $Nm^3$/hr. The raw coal is fed 14 to a pulverizer/crusher 16 where the raw coal is reduced to particulate size. Primary air carries the coal particulates from the pulverizer/crusher 16 to the boiler 18, where the coal is burned to convert water into steam. The temperature of the flue gases leaving the boiler/furnace 18 ranges from 1400 to 2200° F. The flue gases are cooled in the superheater and convective pass 20 (economizer/re-heater) to around 600 to 800° F. before entering the air preheater 22. Flue gas temperatures exiting the air preheater 22 and entering the electrostatic precipitator (ESP)/fabric filter 24 range from 220 to 370° F. If the sorbent requirement for mercury capture were 1 lb./MMacf, about 20 lb/hr of sorbent would need to be injected. At 5 lb/MMacf (120 mg/$Nm^3$), the sorbent requirement would be 100 lb/hr.

In a first embodiment of a system 26 for removing elemental mercury or mercury compounds, a starter batch of carbonaceous sorbent is in the form of carbonaceous sorbent 28 stored in a silo 30, with the carbonaceous sorbent 28 being in an agglomerated state because the very small particles thereof tend to stick to each other. Accordingly, the starter batch of the sorbent 28 is fed by a feeder 32 to a separation device 34, which comminutes (if necessary) and de-agglomerates the sorbent particles 28 into a contact batch of carbonaceous sorbent and a retained batch of carbonaceous sorbent. The contact batch of carbonaceous sorbent has a particle size distribution of carbonaceous sorbent of $d_{50}$<15 microns, where $d_{50}$ represents 50% of the particles by mass in the entire distribution in the contact batch with the particle size distribution of carbonaceous sorbent in the contact batch after separation being less than the particle size distribution of carbonaceous sorbent in the starter batch before separation and less than the particle size distribution of carbonaceous sorbent in the retained batch.

This device 34 may be a particle-particle separator or a jet mill, where compressed air or high-pressure steam is the energy source. The separation device 34 performs three functions: particle-particle separation; particle size reduction; and classification of fine particles to "product" and either return of the coarse particles to the silo 30 or retention of the coarse particles within the separation device 34 for further processing.

The target particle size distribution is $d_{50}$<15 microns, preferably $d_{50}$<8 microns and most preferably $d_{50}$<4 micron, where $d_{50}$ represents 50% of the particles by mass in the entire distribution. Primary particle size reduction is required when the starting particle size distribution is larger than desired product size. No primary size reduction is required if the primary particle sizes are already smaller than the target product size, such as in the case of carbon black where the primary particle size less than 1 micron. The minimum energy input for this separation and optional size reduction device 34 is 10 kWh/ton, more preferably it is 100 kWh/ton, and most preferably it is 1000 kWh/ton. This energy input can be supplied via high pressure fluid such as steam or compressed air 36 in an air jet mill, or by media such as grinding balls or rollers in a ball mill or roller mill.

In addition to handling thereof by the separation device 34, the sorbent particles 28 are subjected to one or more processes before they are injected into the stream of flue gas. In one alternative, the sorbent particles 28 are sent along a path 38 from the silo 30 to an oxidizer unit 40, where the particles are contacted by an oxidizing agent 42 (e.g., ozone, hydrogen peroxide, hot air, concentrated nitric acid), making the outer surfaces of the particles hydrophilic. The treated sorbent may then be fed along a path 44 to the separation device 34 or sent along a path 46 to a blender 48 where a solution 50 is sprayed 52 on the sorbent particles by a sprayer 54 to deposit a halogen on the surface of the sorbent particles 28. The solution 50 is chosen from potassium iodide, iodine dissolved in potassium iodide, alkali halides (e.g., NaCl), and halide salts (e.g., $CaCl_2$), or halogen acids (e.g., HCl, HI, HBr, HF) dissolved in water. A typical additive amount results in a halogen concentration in the sorbent of about 0 to 5 percent. The treated sorbent is then fed along a path 56 to the separation device 34.

A halogen 58, such as chlorine, bromine, iodine or fluorine, may also be deposited on the sorbent 28 by vaporizing the halogen 58 in a vaporizer 60 and condensing/adsorbing it on the sorbent 28. The vaporized halogen may be injected along a path 62 into the sorbent 28 between the particle oxidizer 40 (described above) and the feeder 32, between the feeder 32 and the separation device 34, or onto the "fines" and de-agglomerated particles leaving the separation device 34.

Figure 6:
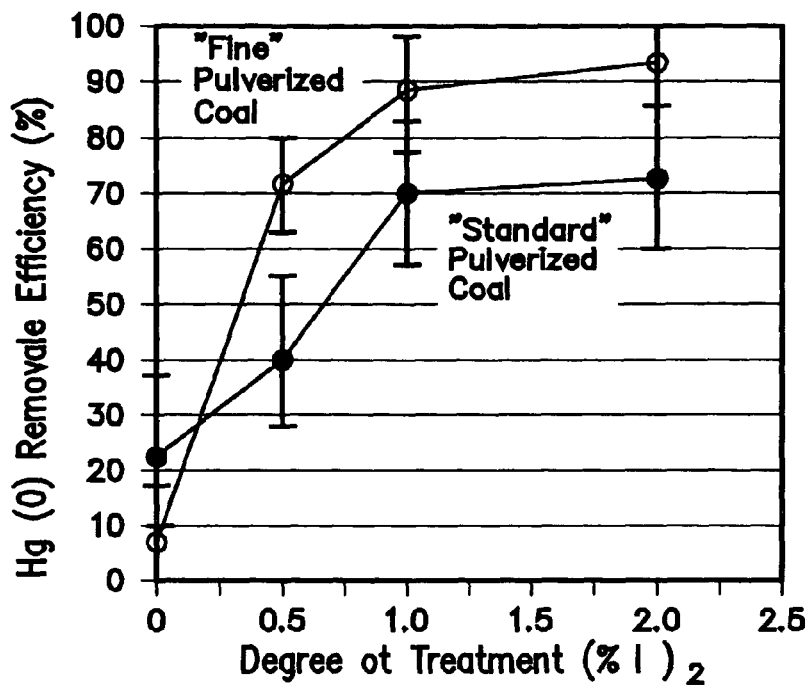
FIG. 6 is a graph illustrating the effect of sorbent particle size and halogen treatment on mercury capture.

The effect of halogen treatment on mercury removal is shown in FIG. 6 and Table 1. FIG. 6 shows that treating coal sorbent 28 with iodine (0 to 2.5 weight percent) significantly improves sorbent performance. About 10 percent mercury removal was obtained with no iodine treatment for "fine" coal sorbent, while about 95 percent mercury removal was obtained with 2.0 percent iodine addition to "fine" coal sorbent. Table 1 shows the effect of halogen treatment for carbon black sorbent and activated carbon sorbent. For carbon black with a surface area of 100 $m^2$/g and at a sorbent concentration of 50 mg/$Nm^3$ in the flue gas, addition of iodine to sorbent 28 (1 percent $I_2$ in carbon after treatment) improved the mercury removal performance from 20 percent to 100 percent. For activated carbon at a sorbent concentration of 100 mg/$Nm^3$ in the flue gas, addition of iodine to sorbent (1 percent $I_2$ in carbon after treatment) improved the mercury removal performance from 75 percent to 90 percent.

TABLE 1

Mercury Removal Efficiencies from an Air Stream with Various Sorbents and Sorbent Concentrations (~200° F.)

| Sorbent | Sorbent Concentration (mg/$Nm^3$) | | | | |
|---|---|---|---|---|---|
| | 0 | 20 | 35 | 50 | 100 |
| Carbon Black (SA = 100 $m^2$/g, $d_{50}$ < 1 μm) | 0 | <5 | — | 20 | 30 |
| Carbon Black (SA = 500 $m^2$/g, $d_{50}$ < 1 μm) | 0 | <5 | — | 20 | — |
| Carbon Black (SA = 500 $m^2$/g with 1% $I_2$) | 0 | 40 | 60 | 100 | 100 |
| Carbon Black (SA = 100 $m^2$/g with 1% $I_2$ | 0 | 20 | — | 100 | 100 |
| Activated Carbon ($d_{50}$ = 18 μm) with 1% $I_2$ | 0 | 15 | — | 60 | 90 |
| Activated Carbon ($d_{50}$ = 18 μm) | 0 | — | — | — | 75 |

*SA = Surface area;
$d_{50}$ = Weight mean particle size

Figure 7:
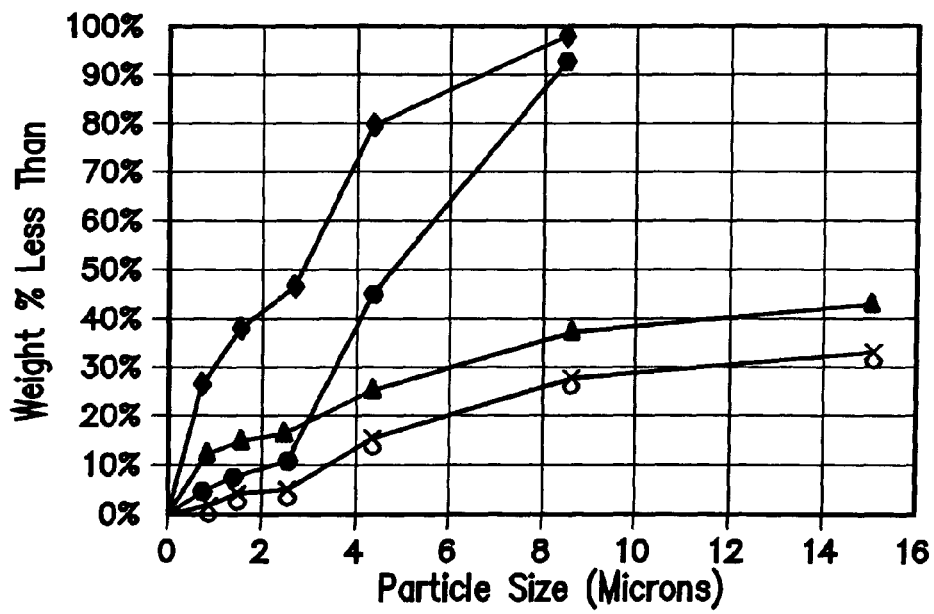
FIG. 7 is a graph illustrating the effect of dispersion on in-situ particle size distribution.

FIG. 7 shows in-situ size distributions for two samples injected into a duct with different levels of energy used for particle-particle separation (de-agglomeration). The first sample is a "coarse" commercial powdered activated carbon, with a mean particle size ($d_{50}$) of 18 μm. The second sample is a "fine" sorbent with a mean particle size ($d_{50}$) of 3 μm. When either sample was injected into the duct with a low energy level being used for particle separation ("poor" dispersion), the actual size of particles observed in the duct was significantly coarser than when higher energy was used for particle separation ("high" dispersion).

The static pressure of air leaving the separation device 34 is around 5 to 10 inches water gauge. This static head may be insufficient to transport and distribute the sorbent 28 via the injection lances into the flue gas duct. As seen in FIG. 1, a "dirty air" material-handling fan/blower 64 may be placed after the separation device 34 to increase the static head for sorbent transport and distribution. A static head of about 30 inches water gauge is preferred.

The inventive apparatus also comprises a means for disposing the contact batch of carbonaceous sorbent into contact with the products of fuel conversion at a contact location such that the carbonaceous sorbent of the contact batch adsorbs mercury. Accordingly, the de-agglomerated sorbent 28 and the conveying air/steam is injected at a contact location 66 into the flue gas duct through such a means in the form of a distributor 68 having multiple lances. The injector tip is designed to impart a tangential momentum to the sorbent stream (swirl tip) and increase the rate of spread and distribution of the sorbent 28 in the flue gas stream 12. The sorbent 28 may be injected into the flue gas stream 12 between the boiler 18 and the convective pass/superheater 20, between the convective pass/superheater 20 and the air preheater 22, or between the air preheater 22 and the ESP/fabric filter 24.

Thus, the system 26 for removing elemental mercury or mercury compounds handles carbonaceous sorbent 28 of a starter batch stored in a silo 30 in an agglomerated state. The sorbent 28 is fed by a feeder 32 to a separation device 34, which comminutes (if necessary) and de-agglomerates the sorbent particles 28 to their primary size distribution. The de-agglomerated sorbent 28 of a contact batch created from the starter batch is then conveyed by the airsteam for injection at a contact location 66 in a flue gas duct whereat carbonaceous sorbent of the contact batch adsorbs mercury from the flue gas. Preferably, the transport means of the inventive apparatus which transports carbonaceous sorbent of the contact batch to the contact location operates to deliver, on average, at least ninety percent (90%) of the carbonaceous sorbent of the contact batch to the contact location 66 in less than thirty (30) minutes following the separation of the carbonaceous sorbent of the starter batch into the carbonaceous sorbent of the contact batch and the carbonaceous sorbent of the retained batch, more preferably operates to deliver, on average, at least ninety percent (90%) of the carbonaceous sorbent of the contact batch to the contact location 66 in less than five (5) minutes following the separation, and, most preferably, operates to deliver, on average, at least ninety percent (90%) of the carbonaceous sorbent of the contact batch to the contact location 66 in less than one (1) minute following the separation.

Figure 2:
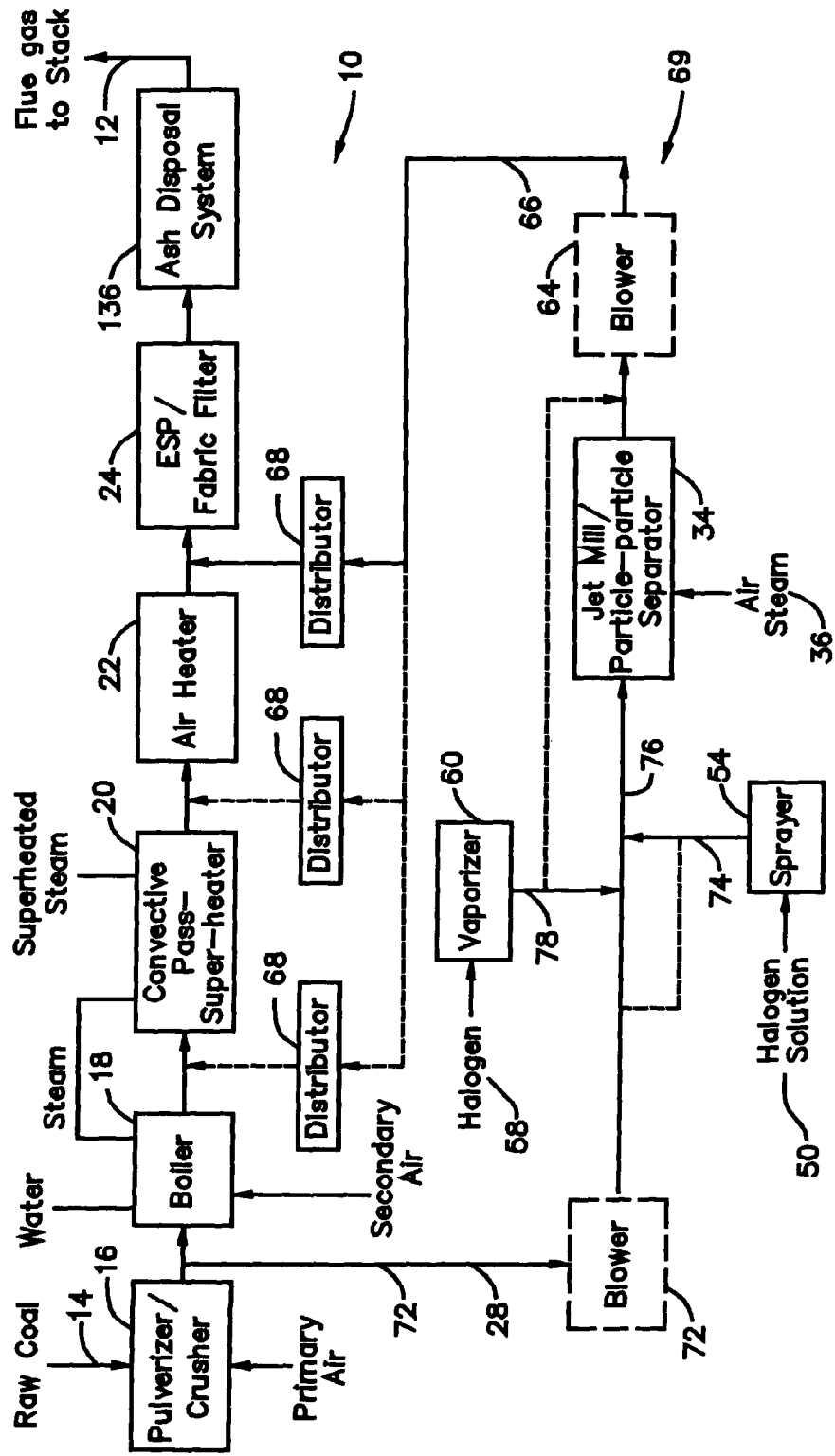
FIG. 2 is a schematic diagram of a second embodiment in accordance with the present invention of a system for removing elemental mercury or mercury compounds from the flue gases from coal combustion.

In a second embodiment of a system for removing elemental mercury or mercury compounds in accordance with the present invention and shown in FIG. 2, hereinafter designated as a system 69 for removing elemental mercury or mercury compounds, a portion of the coal pulverized in the pulverizer 16 is extracted at a location 70 from the pulverizer exit as sorbent 28. Preferably between 10 to 1000 lb/hr of coal (about 0.01 to 1.0 percent of total coal feed to boiler), more preferably between 50 and 500 lb/hr, and most preferably between 100 and 200 lb/hr is extracted at the location 70. A blower 72 may be required to provide the necessary motive force for moving the extracted sorbent solids 28.

The extracted sorbent solids 28 are subjected to one or more processes. The sorbent solids 28 may be sprayed at a location 74 with a solution 50 to deposit a halogen on the surface of the sorbent particles 28. The solution 50 is chosen from potassium iodide, iodine dissolved in potassium iodide, alkali halides (e.g. NaCl), and halide salts (e.g. $CaCl_2$), or halogen acids (e.g. HCl, HI, HBr, HF) dissolved in water. A typical additive amount results in a halogen concentration in the sorbent 28 of about 0 to 5 percent. The treated sorbent 28 is then fed along a path 76 to the separation device 34.

A halogen 58, such as chlorine, bromine, iodine or fluorine, may also be deposited on the sorbent by vaporizing the halogen in a vaporizer 60 and condensing/adsorbing it on the sorbent. The vaporized halogen may be injected at a location 78 into the sorbent 28 between the blower 72 and the separation device 34, or onto the "fines" and de-agglomerated particles leaving the separation device 34.

A "dirty air" material-handling fan/blower 64 may be placed after the separation device 34 to increase the static head for sorbent transport and distribution. The de-agglomerated sorbent 28 and the conveying air/steam is injected into the flue gas duct through a distributor 68 similar to that of the first embodiment 26. The sorbent 28 may be injected into the flue gas stream 12 between the boiler 18 and the convective pass/superheater 20, between the convective pass/superheater 20 and the air preheater 22, or between the air preheater 22 and the ESP/fabric filter 24.

Figure 3:
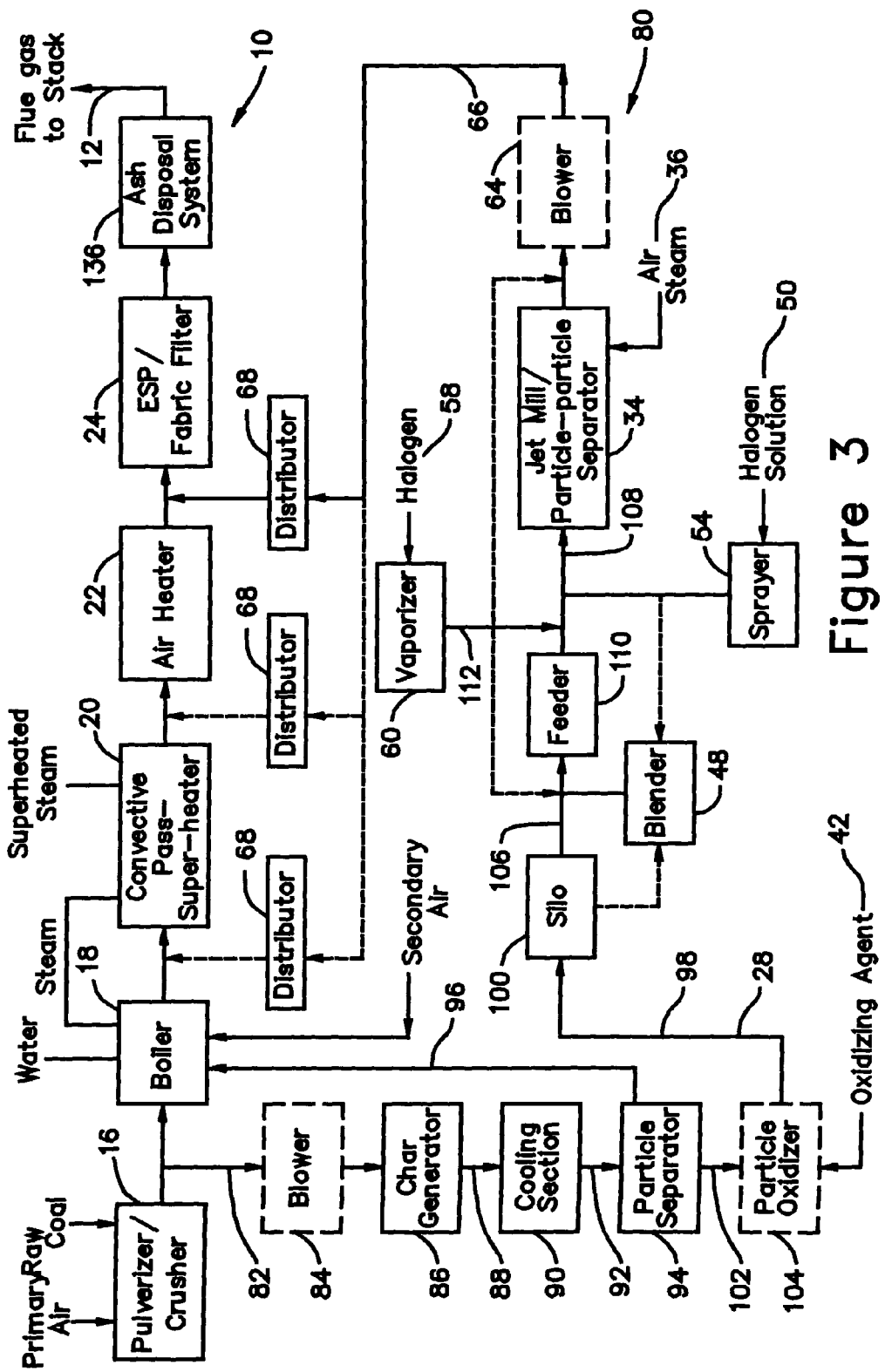
FIG. 3 is a schematic diagram of a third embodiment of a system in accordance with the present invention for removing elemental mercury or mercury compounds from the flue gases from coal combustion.

In a third embodiment of a system for removing elemental mercury or mercury compounds in accordance with the present invention and shown in FIG. 3, hereinafter designated as a system 80 for removing elemental mercury or mercury compounds, a portion of the coal pulverized in the pulverizer 16 is also extracted at a location 82 from the pulverizer exit as sorbent 28. Preferably between 10 to 1000 lb/hr of coal (about 0.01 to 1.0 percent of total coal feed to boiler), more preferably between 50 and 500 lb/hr, and most preferably between 100 and 200 lb/hr is extracted at the location 82. A blower 84 may be required to provide the necessary motive force for moving the extracted sorbent solids 28.

The extracted coal is partially combusted in a char generator reactor 86 by subjecting the coal to temperatures between 300 and 1500° C. The air supply to the char generator 86 is limited to achieve only partial combustion of the coal, preferably only the volatile portion of the coal. Accordingly, air amounts are preferably controlled between 0.3 and 1.0 times the amount required for complete combustion of coal, and more preferably between 0.5 and 0.7 times the amount required for complete combustion of coal.

The high temperatures of the solids and gases exiting along a path 88 the char generator 86 are reduced in a downstream cooling section 90. Water quenching or an air-, water- or steam-cooled heat exchanger may be used to cool the gases and the solids. The temperature of the gases and solids exiting the cooling section 90 is preferably around 300° C. or lower.

The cooled gases and solids (char) are then sent along a path 92 to a particle separator 94, preferably a cyclone. The separated gases, with some fine particles, are discharged at a location 96 to the main boiler 18 to ensure complete combustion of the unburnt hydrocarbons and other combustible species like carbon monoxide and carbon. The particles 28 separated by the particle separator 94 are discharged along a path 98 to a silo 100. Alternatively, the sorbent particles 28 may be discharged along a path 102 to an oxidizer unit 104, where the particles 28 are contacted by an oxidizing agent 42 (e.g. ozone, hydrogen peroxide, hot air, concentrated nitric acid), making the outer surfaces of the particles hydrophilic. The treated sorbent is then discharged along a path 98 to the silo 100.

As the sorbent 28 is fed along a path 106 from the silo 100 to the flue gas stream 12, a halogen is deposited on the outer surface of the sorbent particles 28. In one alternative, the sorbent particles 28 are sent to a blender 48 where a solution 50 is sprayed on the sorbent particles 28 to deposit the halogen on the surface of the sorbent particles 28. The solution 50 is chosen from potassium iodide, iodine dissolved in potassium iodide, alkali halides (e.g., NaCl), and halide salts (e.g., $CaCl_2$), or halogen acids (e.g., HCl, HI, HBr, HF) dissolved in water. A typical additive amount results in a halogen concentration in the sorbent of about 0 to 5 percent. The treated sorbent 28 is then fed along a path 108 to the separation device 34 by a feeder 110.

Alternatively, the halogen (e.g., chlorine, bromine, iodine or fluorine) may be deposited on the sorbent by vaporizing the halogen 58 in a vaporizer 60 and condensing/adsorbing it on the sorbent 28. The vaporized halogen may be injected at a location 112 into the sorbent 28 between the silo 100 and the feeder 110, between the feeder 110 and the separation device 34 or onto the "fines" and de-agglomerated particles leaving the separation device 34.

A "dirty air" material-handling fan/blower 64 may be placed after the separation device 34 to increase the static head for sorbent transport and distribution. The de-agglomerated sorbent 28 and the conveying air/steam is injected into the flue gas duct through a distributor 68 similar to that of the first embodiment 26. The sorbent 28 may be injected into the flue gas stream 12 between the boiler 18 and the convective pass/superheater 20, between the convective pass/superheater 20 and the air preheater 22, or between the air preheater 22 and the ESP/fabric filter 24.

Figure 8:
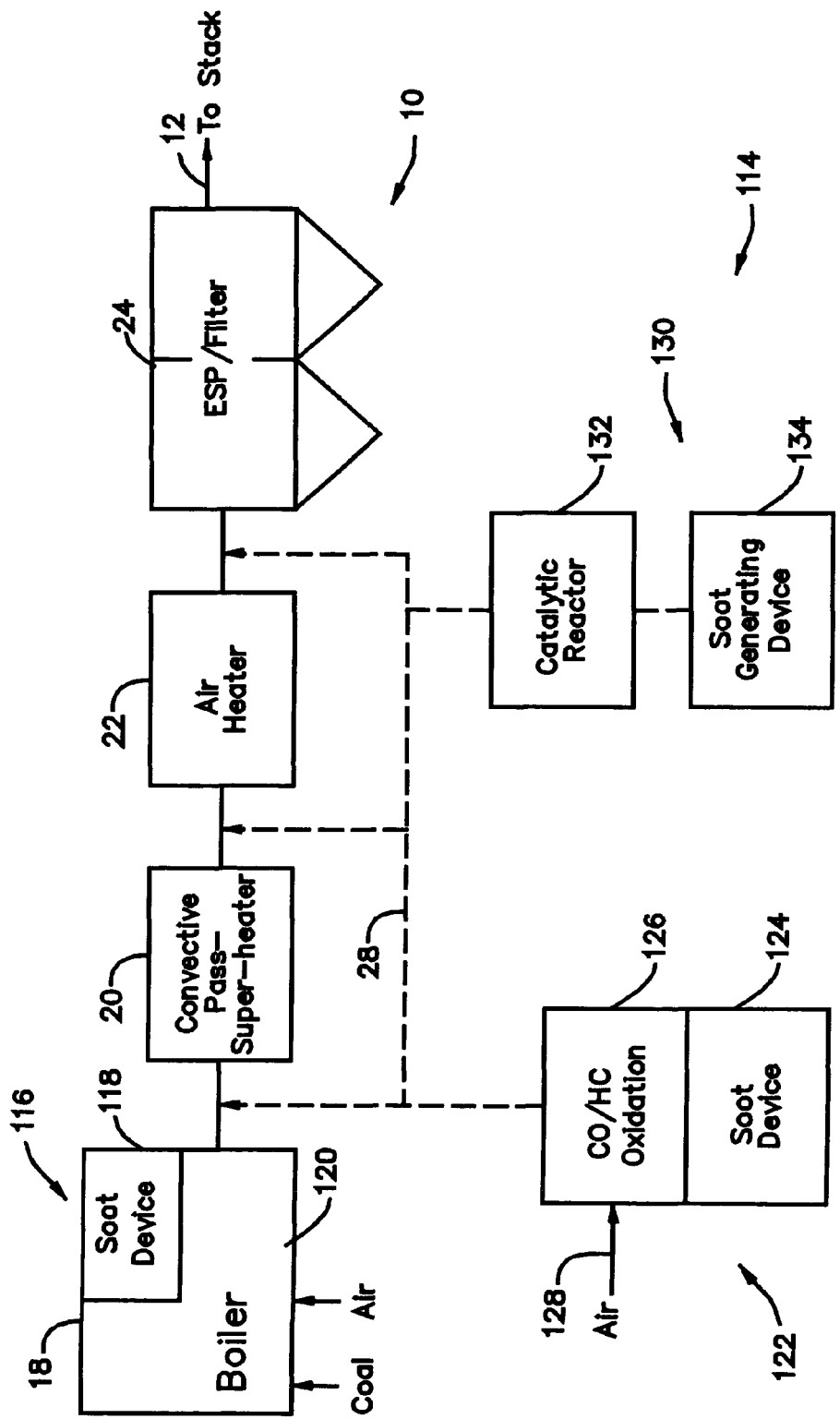
FIG. 8 is a schematic diagram of a fourth embodiment of a system in accordance with the present invention for removing elemental mercury or mercury compounds from the flue gases from coal combustion.

In a fourth embodiment of a system for removing elemental mercury or mercury compounds in accordance with the present invention and shown in FIG. 8, hereinafter designated as a system 114 for removing elemental mercury or mercury compounds, the sorbent 28 has the most preferable particle size mercury removal system—namely, $d_{50}$<2 micron, where $d_{50}$ represents 50% of the particles by mass in the entire distribution—and this is achieved in this fourth embodiment by configuring the sorbent 28 as carbon black or soot. Compared to "coarse" and "agglomerated" activated carbon, much smaller quantities of carbon black/soot are required to capture a prescribed amount of mercury in boiler flue gases. For example, to remove 90% of elemental mercury, 50 mg/$Nm^3$ of impregnated carbon black are required compared to greater than 1000 mg/$Nm^3$ of "coarse" and "agglomerated" activated carbon. Also, much smaller quantities of oxidizing agents such as iodine would be required for impregnation of the sorbent 28 (less than 1% by weight of carbon) compared to activated carbon, where 1-10% by weight of carbon would be required.

Figure 9:
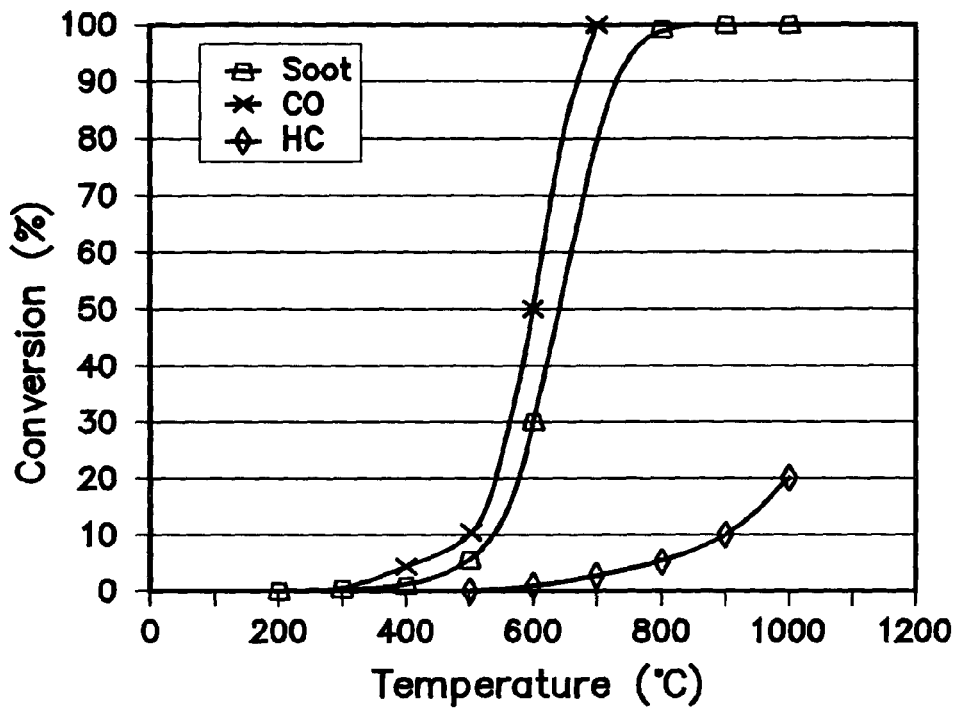
FIG. 9 is a graph illustrating conversion (%) of soot, CO, and HC as a function of temperature (° C.)

In a sub-assembly 116 of this system 114 for generating the sorbent 28 with a desirably very fine particle size distribution, a soot-generating device 118 is disposed within the high temperature region of the boiler 18. An oxidizing region 120 of the boiler 18, downstream of the soot device 118, ensures that the CO and HC generated during the soot generating process are destroyed. With reference to FIG. 9, the temperature range in the oxidizing region is preferably 500 to 1000° C., and more preferably 600 to 800° C., to ensure minimal soot destruction and maximal CO/HC destruction.

In an alternative sub-assembly 122 of this system 114 for generating the sorbent 28 with a desirably very fine particle size distribution, the carbon black/soot is generated in a separate soot generating device 124 having a CO/HC oxidation chamber 126. The CO/HC oxidation chamber 126 may have an input 128 for receiving oxygen or air required to destroy the CO/HC. The residence time of the stream of carbon black/soot within the CO/HC oxidation chamber 126 and the temperature maintained in the CO/HC oxidation chamber 126 (preferably 500 to 1000° C., and more preferably 600 to 800° C.) are optimized to destroy the CO/HC with minimal soot destruction.

Figure 10:
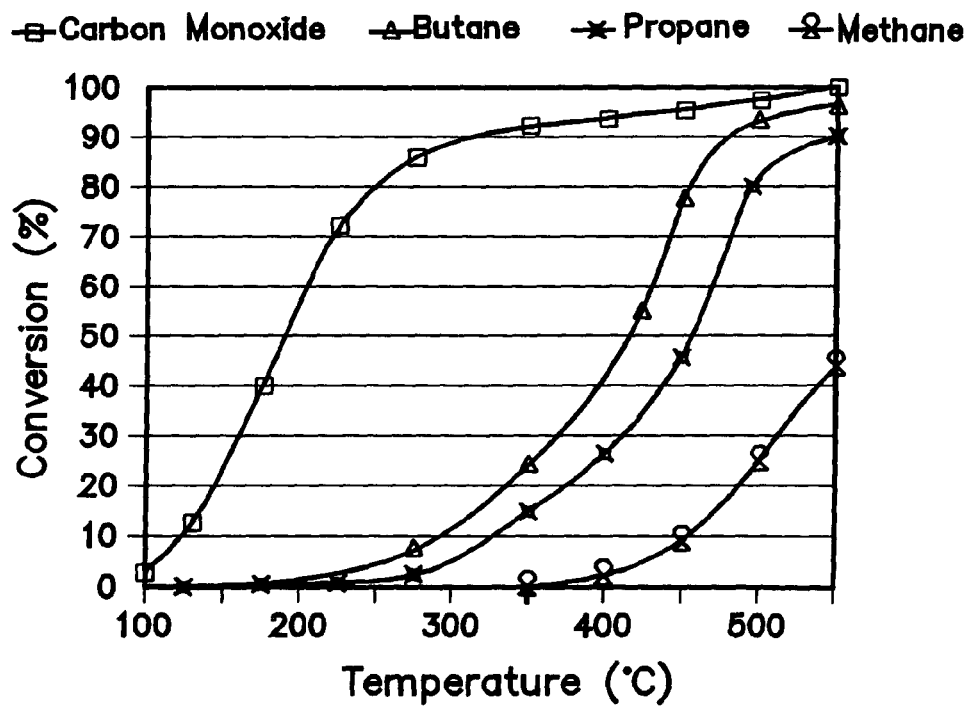
FIG. 10 is a graph illustrating a typical destruction profile for CO and HC with a PGM catalyst.

In still another alternative sub-assembly 130 of this system 114 for generating the sorbent 28 with a desirably very fine particle size distribution, a catalytic reactor 132 for targeted CO and HC destruction is disposed between the soot generating device 134 and the flue gas stream 12. One example of such a catalytic reactor 132 is a monolith (e.g. made of stainless steel or ceramic) coated with a variety of platinum group metals (e.g., platinum, rhodium, palladium). A typical destruction profile for CO and HC with a PGM catalyst is shown in FIG. 10. At the temperatures shown in FIG. 10, soot would not be destroyed to any significant extent.

In conventional coal-fired plants, unburnt carbon arriving at the electrostatic precipitator (ESP) or fabric filter is predominantly in the form of the large coal particles that have not finished combustion. Fine particles of coal are rarely present in the normal application since they are completely burnt out. In conventional plants, therefore, the ash collected in the precipitator or fabric filter consists of predominantly larger carbon particles and smaller fly ash particles, which are very difficult to separate.

In the mercury removal systems 26, 69, 80, 114 described above, the carbonaceous mercury sorbent 28 is generally manufactured external to the boiler/main combustor 18 and then subsequently reduced in size and then introduced into the flue gas stream 12. The sorbent particles 28 are engineered to be extremely small and are therefore distinct from the ash and may be separated from the normal ash in the ash disposal system 136 shown in FIGS. 1-3.

Figure 4:
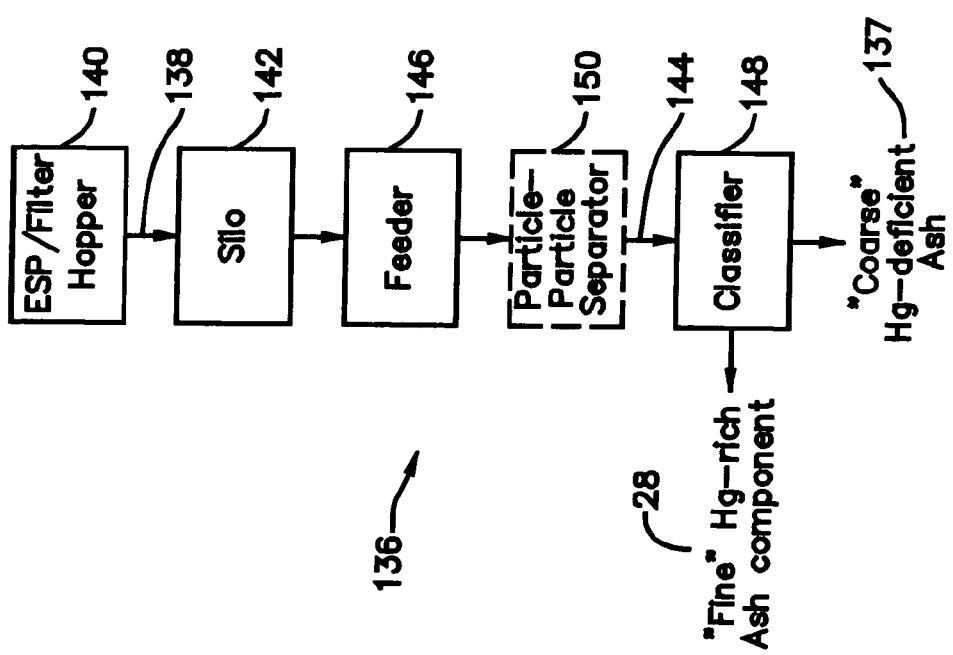
FIG. 4 is a schematic diagram of the ash disposal system of FIGS. 1-3.

With reference to FIG. 4, the mercury-laden sorbent 28 is collected in the ESP/fabric filter 24, along with fly ash 137. The mercury-laden sorbent-fly ash mixture is transferred along a path 138 from the hopper 140 of the ESP/fabric filter 24 to an ash storage silo 142 and then fed along a path 144 with a feeder 146 to a classifier 148, which is capable of separating the "fine" and low-density mercury sorbent 28 from the coarser and denser fly ash 137. The classifier 148 is preferably of the dynamic type with a separately controlled classifier wheel, operating at tip speeds of preferably greater than 50 m/s and more preferably 100 m/s to ensure good separation and product recovery.

A particle-particle separator 150 may be disposed between the silo 142 and the classifier 148. The function of the particle-particle separator 150 is to separate the mercury-laden sorbent 28 from the fly ash 137, which would have agglomerated as a result of being collected together in the ESP/fabric filter 24 and stored in the hopper 140 and silo 142. A jet mill can be used for this purpose, although, little size reduction is required and therefore the energy consumption would be lower than if the particle size has to be reduced.

Figure 5:
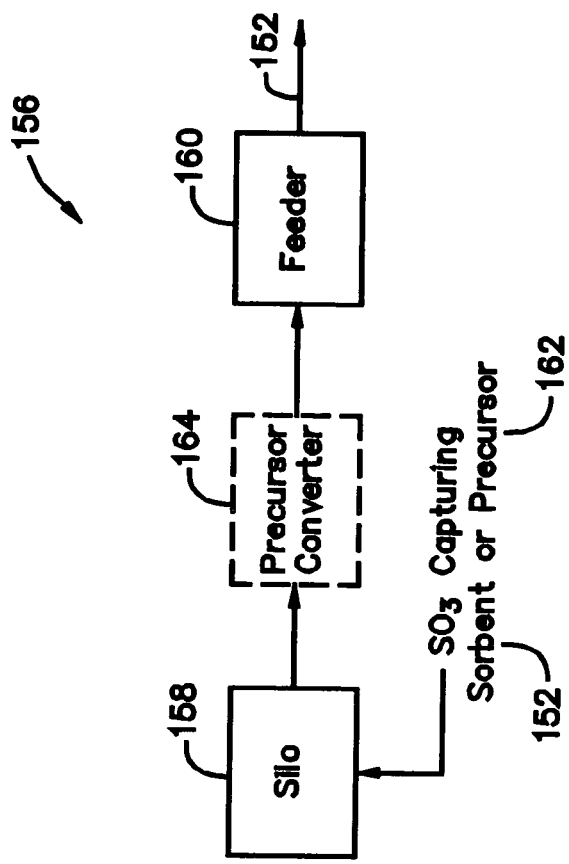
FIG. 5 is a schematic diagram of an optional $SO_3$ (sulfur trioxide) sorbent addition subsystem.

As shown in FIG. 1, a $SO_3$ (sulfur trioxide)-capturing sorbent 152 may be injected at a location 154 into the flue gas stream 12 along with or separate from the mercury sorbent 28. With additional reference to FIG. 5, a system 156 for injecting the $SO_3$ (sulfur trioxide)-capturing sorbent 152 includes a silo 158. The $SO_3$ (sulfur trioxide)-capturing sorbent 152 stored in the silo 158 is metered to the separation device 34 by a feeder 160. The de-agglomerated particles 152 are then injected into the flue gas duct by the blower 64 and distributor 68. A separation device, blower and distributor which are separate from the ones used by the mercury sorbent 28 may also be utilized (not shown). Alternatively a $SO_3$ (sulfur trioxide)-capturing sorbent precursor 162 may be stored in the silo 158 and fed to a precursor converter 164. For example, limestone 162 may be stored in the silo 158 and converted to lime 152 in a calciner 164. It should be appreciated that the $SO_3$ (sulfur trioxide)-capturing sorbent system 156 may be used with or separate from any of the mercury removal systems 26, 69, 80, 114.

In accordance with the present invention, treatment of the carbonaceous sorbent with additives may be undertaken to further improve the oxidation and capture of mercury. These additives include halogens (chlorine, bromine, iodine, fluorine) and halides (examples include ammonium chloride, ammonium bromide, iron chloride, iron bromide, zinc chloride), $H_2SO_4$ and $H_3PO_4$. These additives may be added (for example by spraying) to the carbonaceous material as a water-based solution or another solvent (such as alcohol)-based solution followed by evaporation of the water/solvent. An example for incorporating the additive into the carbonaceous material via a solution is iron chloride.

Additives may also be added by mixing them with the carbonaceous sorbent and heating them to a temperature that will volatilize the additive locally but distribute it by subsequent adsorption on the carbon. It is preferred that the temperature to which the carbonaceous material and additive are heated is above 400° F. and most preferably above 500° F., to ensure that it will be stable when injected in the flue gas at those temperatures. An example of additive that can be incorporated in the above fashion is iodine or bromine.

In accordance with the present invention, carbon-based sorbent is injected at a location where interaction between injected sorbent and mercury in flue gas is maximized both for (1) oxidation of mercury on sorbent surface and for (2) its subsequent capture by sorbent. The following three types of temperatures are preferably taken into account in determining the sorbent injection location: injection temperature, collection temperature and exposure temperature range. In this regard, the injection temperature is deemed to be the temperature of the location at which the sorbent and the flue gas are first in contact with one another. Also, the collection temperature is deemed to be the temperature of a given collection location at which carbonaceous sorbent having mercury absorbed thereon is separated from the flue gas either with or without other solids, gases, or liquids entrained with the flue gas. Accordingly, a given collection location may be a respective known particulate removal device such as a cyclone, an electrostatic precipitator (ESP), a baghouse, or a particulate scrubber.

Figure 11:
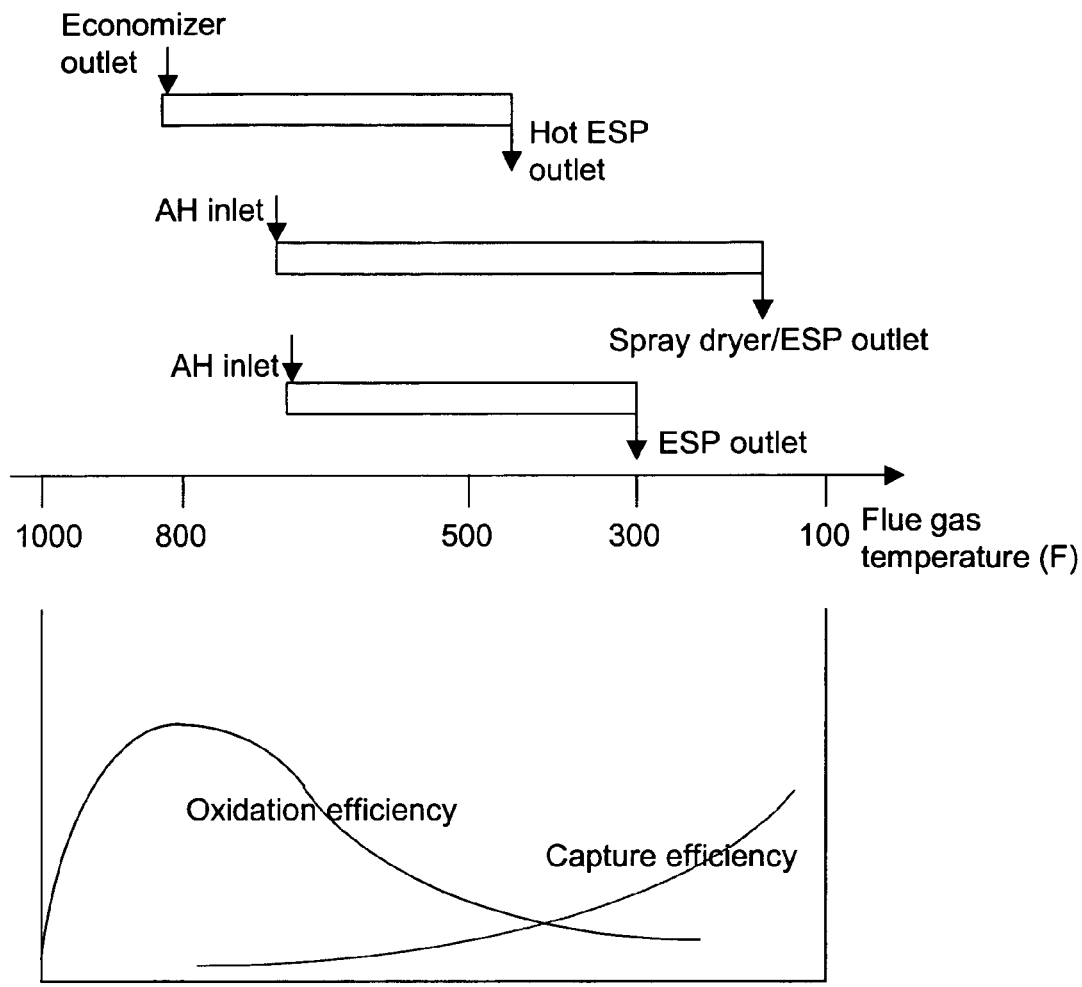
FIG. 11 is a graph illustrating examples of the exposure temperature of sorbents in accordance with the present invention for air heater-ESP, air heater-spray dryer-ESP and hot ESP configurations.

In connection with the capture of mercury in flue gas generated by the combustion of fossil fuels such as coal, it is believed that the sorbent injection temperature will typically be from 400 to 1100° F., and the sorbent collection temperature from 100 to 800° F. The exposure temperature range is bound by the injection temperature—namely, the flue gas temperature at which sorbent is injected—and the collection temperature—namely, the flue gas temperature at which the majority of the sorbent is removed from the flue gas. Additionally, the exposure temperature range (injection temperature minus collection temperature) should preferably be greater than 50° F., preferably greater than 100° F., and more preferably greater than 200° F. (temperature drop due to spray dryer excluded). FIG. 11 shows examples of the exposure temperature of sorbents in accordance with the present invention for air heater-ESP, air heater-spray dryer-ESP and hot ESP configurations.

Trials have shown that, with respect to the injection of activated carbon at temperatures higher than 400° F. into a flue gas obtained from the combustion of coal, mercury oxidation and removal were higher than if was injected at lower temperatures.

Figure 12:
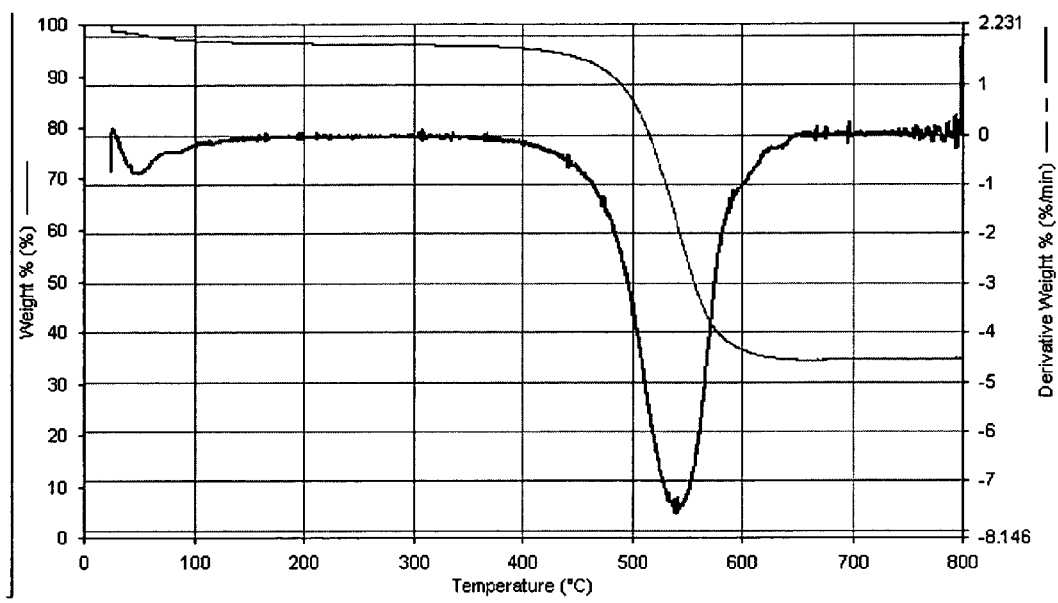
FIG. 12 is a graph illustrating a thermo-gravimetric analysis of the sorbent in the form of fine activated carbon in 5% $O_2$ in $N_2$ to determine its ignition temperature.

There is an upper limit in temperature, however, to be taken into account in selecting the injection point. The selection of this limit takes into account the reaction of activated carbon with oxygen in the flue gas at high temperatures, which results in the consumption of the activated carbon. For example, subjecting activated carbon to increasing temperatures in a gas stream containing about 5 percent oxygen (typical for flue gas) may lead to weight loss above approximately 750° F. (see FIG. 12, which is a graph illustrating a thermo-gravimetric analysis of the sorbent in the form of fine activated carbon in 5% $O_2$ in $N_2$ to determine its ignition temperature). This provides a qualitative measure of the upper temperature limit. Since this exposure of the carbon in the boiler flue gas is more appropriately measured in seconds rather than minutes, it can be expected that the upper temperature limit will be higher closer to 1000° F.

These temperature limits identify the preferred temperature range for carbon injection for mercury capture and oxidation. This range is preferably between 400° F. and 1100° F. and more preferably between 500° F. and 900° F. and most preferably between 550° F. and 750° F. While these temperature ranges are appropriate for the carbonaceous material used in the description of this example, it is to be understood that the above-identified temperature limits will differ for different types of carbonaceous material, for the gas compositions they are subjected, and the residence time the carbon is exposed at the high temperature. Hence, efficacious capture of mercury in flue gas via injection of a carbonaceous sorbent at relatively higher temperatures should be expected to be constrained only by the process limits such as noted above and not by the absolute specific temperature targets.

Figure 13:
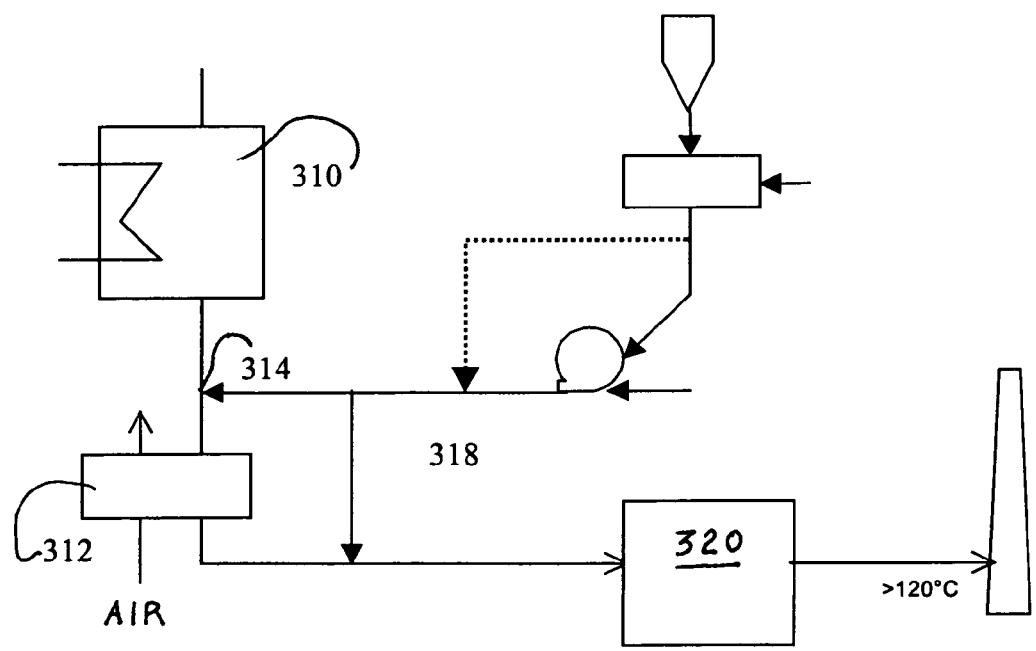
FIG. 13 is a schematic illustration of an arrangement having a sorbent injection location corresponding to the selectively determined process limits.

An example of a sorbent injection location corresponding to the above-noted process limits is schematically shown in FIG. 13. In coal-fired boilers, coal is combusted to generate hot flue gas and the hot flue gas passes through a series of heat exchangers and its heat extracted to make superheated steam. The heat exchangers, in a typical conventional configuration, may consist, in a first portion thereof that is not illustrated herein, of a radiant furnace section (for saturated steam production), followed by convective superheater and reheater sections (for superheated steam production). A further downstream portion of the heat exchanger configuration, that is illustrated in FIG. 13, includes an economizer section 310 for preheating the water (before it goes to the radiant furnace for saturated steam production), and an air heater section 312 (for preheating the combustion air). For the limits identified, the optimum injection location of the carbonaceous sorbent into the flue gas stream is a location 314 between the economizer and the air heater.

The carbonaceous sorbent injected in the flue gas is injected at the exit of the economizer 310. It may be injected directly or treated for size reduction and de-agglomeration in a mill 316 as described below. In a variation of this embodiment of the process, the carbonaceous sorbent is injected in two or more locations, one of the locations being defined by the identified flue gas temperature limits. For example, as shown in FIG. 13, in addition to the injection location 314, a second injection location 318 can be provided that is located downstream of the air heater 312 and upstream of a particulate collection device 320.

Figure 14:
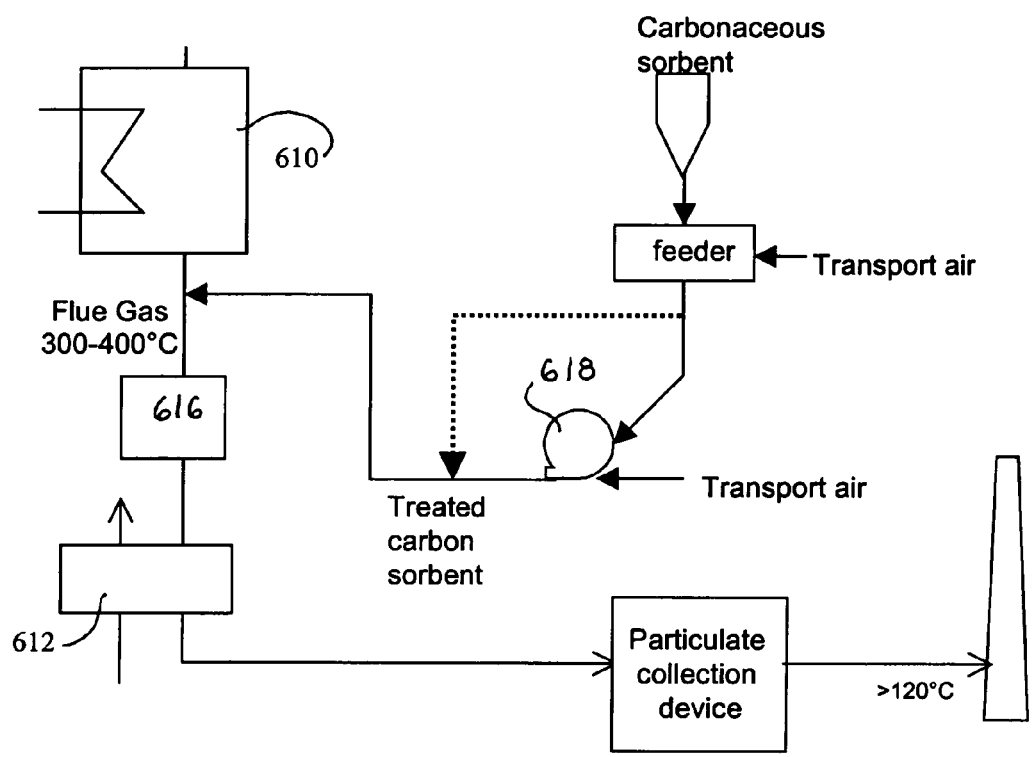
FIG. 14 is a schematic illustration of an arrangement including an SCR and having a sorbent injection location.

Another example of a sorbent injection location is schematically shown in FIG. 14, which illustrates a combustion and flue gas handling arrangement comprising a selective catalytic reactor (SCR). In this arrangement, the heat exchangers, in a typical conventional configuration, may consist, in a first portion thereof that is not illustrated herein, of a radiant furnace section (for saturated steam production), followed by convective superheater and reheater sections (for superheated steam production). A further downstream portion of the heat exchanger configuration, that is illustrated in FIG. 14, includes an economizer section 610 for preheating the water (before it goes to the radiant furnace for saturated steam production), and an air heater section 612 (for preheating the combustion air). For the limits identified, the optimum injection location of the carbonaceous sorbent into the flue gas stream is a location 614 between the economizer 610 and a selective catalytic reactor (SCR) 616.

The carbonaceous sorbent injected in the flue gas is injected at the exit of the economizer 610. It may be injected directly or treated for size reduction and de-agglomeration in a mill 618.

The injection of carbon sorbent in flue gas in accordance with the present invention leads to two groups of carbon sorbent that can be characterized by their respectively different residence times in the boiler system: a first group of injected carbon sorbent that are deemed to be the group of in-flight sorbent particles and a second group of injected carbon sorbent that are deemed to be the group of deposited sorbent particles. The in-flight sorbent particles are defined as those suspended in the flue gas stream in contact with mercury-containing flue gas and are characterized by its residence time as short as 0.01 seconds to 30 seconds. The deposited sorbent particles are those adhered onto the surfaces of the boiler system and in direct contact with mercury in flue gas and are characterized by its longer residence time, from 10 seconds up to 10 days. (The upper limit may be determined by the sootblowing cycle and shedding in ductwork.) From a simplistic kinetics point of view, mercury capture by sorbent is expressed as:

Amount of mercury captured ∝ (total in-flight particle surface)*(in-flight particle residence time)+(total deposited particle surface)*(deposited particle residence time)

Of the two groups of carbon sorbent in the boiler system, therefore, the more preferred group is the deposited sorbent particles as they are in contact with mercury in flue gas much longer than are the other group of particles. In accordance with the present invention, the proportion of deposited sorbent particles for the given amount of carbon sorbent injected, the contact surface area of deposited sorbent particles and the residence time of the deposited sorbent particles within the boiler system are all respectively maximized or optimized.

Figure 15:
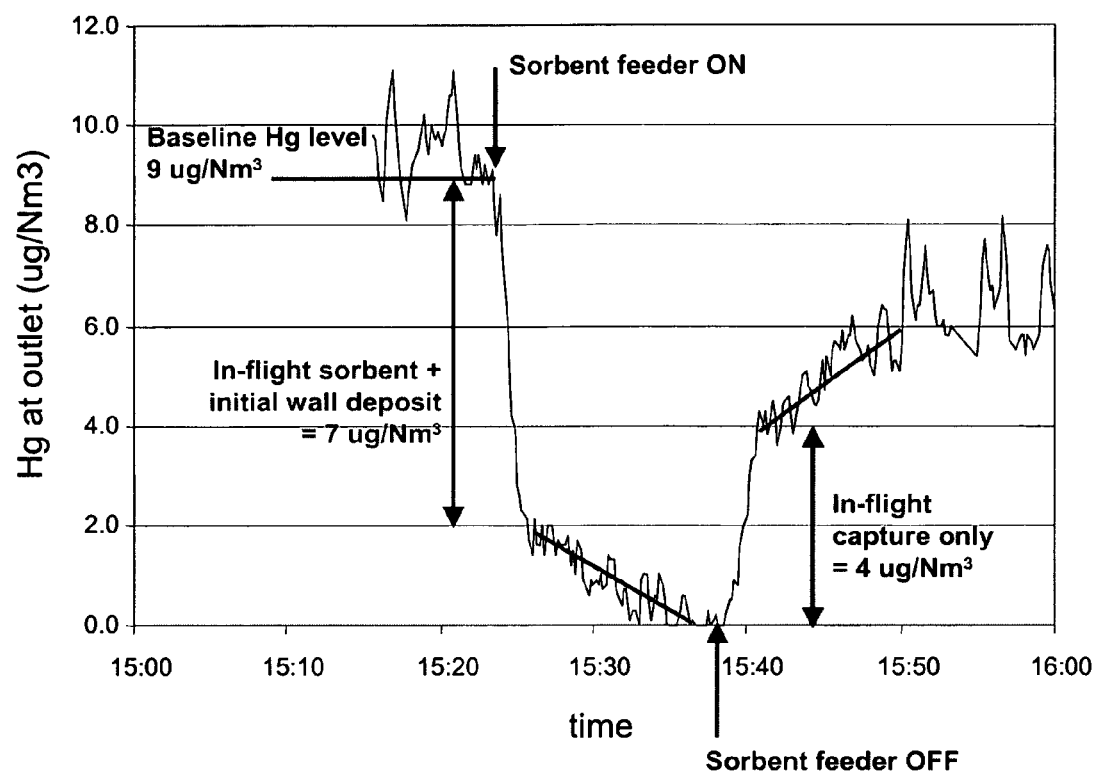
FIG. 15 is a graph illustrating the results of a trial to determine mercury capture efficiency by a first group of injected carbon sorbent that are deemed to be the group of in-flight sorbent particles and a second group of injected carbon sorbent that are deemed to be the group of deposited sorbent particles.

FIG. 15 shows the contribution of these two groups to mercury capture that were observed in a trial. The initial reduction of mercury from 9 to 2 ug/Nm3 is due to in-flight sorbent and initial sorbent deposit on the reactor wall. As more reactor surface is covered by sorbent, mercury level further goes down to zero at a slower rate as shown in the FIG. 15. As soon as the sorbent feeder is turned off, the mercury level is recovered from zero to 4, followed by slow recovery to 6. The recovery from zero to 4 is due to lack of in-flight sorbents, and the recovery from 4 to 6 is due to saturation of deposited sorbent with mercury.

In a typical coal-fired boiler system, the "backpass devices" that provide a large surface area for sorbent deposition in the desired temperature range of 100 to 1000° F. are the air heaters, the selective catalytic reactors (SCR), the electrostatic precipitator (ESP) entrance nozzles, the ESP collection surfaces, the flue gas ductwork and the fabric filters. In accordance with the present invention, sorbent is injected upstream of any of these devices to coat the surfaces provided by them with sorbent particles. The following are examples of sorbent injection upstream of these devices.

Air heaters are used for preheating primary and/or secondary air and are an excellent device to provide a large sorbent deposit surface area. In tubular air heaters, cold air flows over a bank of tubes (shell side) through which hot flue gases pass. Mercury sorbents can be injected into flue gases at a location upstream of the air heater tube inlet so that sorbent particles are uniformly distributed across the cross section of the flue gas stream before they enter the heat exchanger tubes. A portion of sorbent particles going through heat exchanger tubes is deposited (or coated) onto the inner surface of tubes, either by Brownian motion or by turbulent diffusion. Particles are held onto the surface mostly by van der Waals force and interact with mercury in flue gases until they are shed off by sootblowing mechanism or simply by flow around them.

Figure 16:
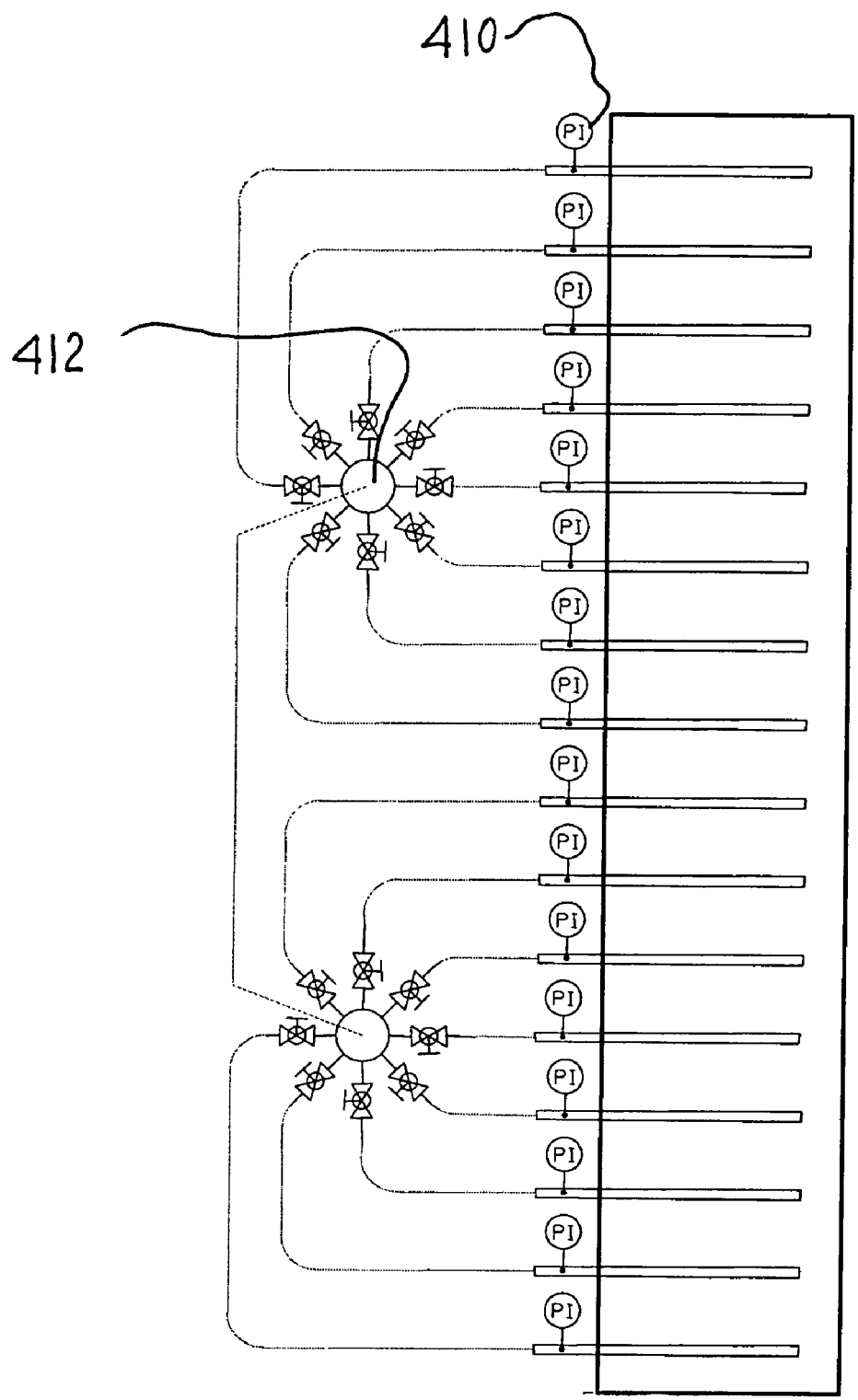
FIG. 16 is a schematic illustration of a plurality of multiple injection ports provided to uniformly distribute sorbent particles across the cross section of the flue gas flow.

Sorbent injection lances are designed and installed upstream of the inlet with spacing that ensures uniform coating of sorbent particles on the heat exchanger tubes. For maximum utilization of the heat exchanger tube surfaces, it is advantageous if, as shown in FIG. 16, a plurality of multiple injection ports 410 are provided to uniformly distribute sorbent particles across the cross section of the flue gas flow. The injection ports 410 may be configured as injection lances and each group of the injection ports 410 are commonly communicated with a respective distribution manifold 412. Uniform distribution of sorbent particles also ensures good contact between in-flight particles and mercury in flue gases.

Rotary regenerative air heaters are regenerative heat exchangers with heat exchanger surface elements rotating between hot flue gas duct and cold air ducts. Injection lance systems can be installed upstream of the rotary regenerative air heaters in the flue gas duct to coat the heat exchanger elements uniformly with sorbent particles.

Sorbent deposition can be enhanced either by modifying the sorbent surfaces or by modifying the surfaces of backpass devices, or both. Sorbent surfaces can be treated with sticky material or its precursors before injection. For example, surfaces of sorbent may be treated with additives such as ammonium bromide, which become sticky as it reacts with sulfur dioxide to form ammonium sulfate. This sticky surface enhances sorbent deposition.

Figure 17:
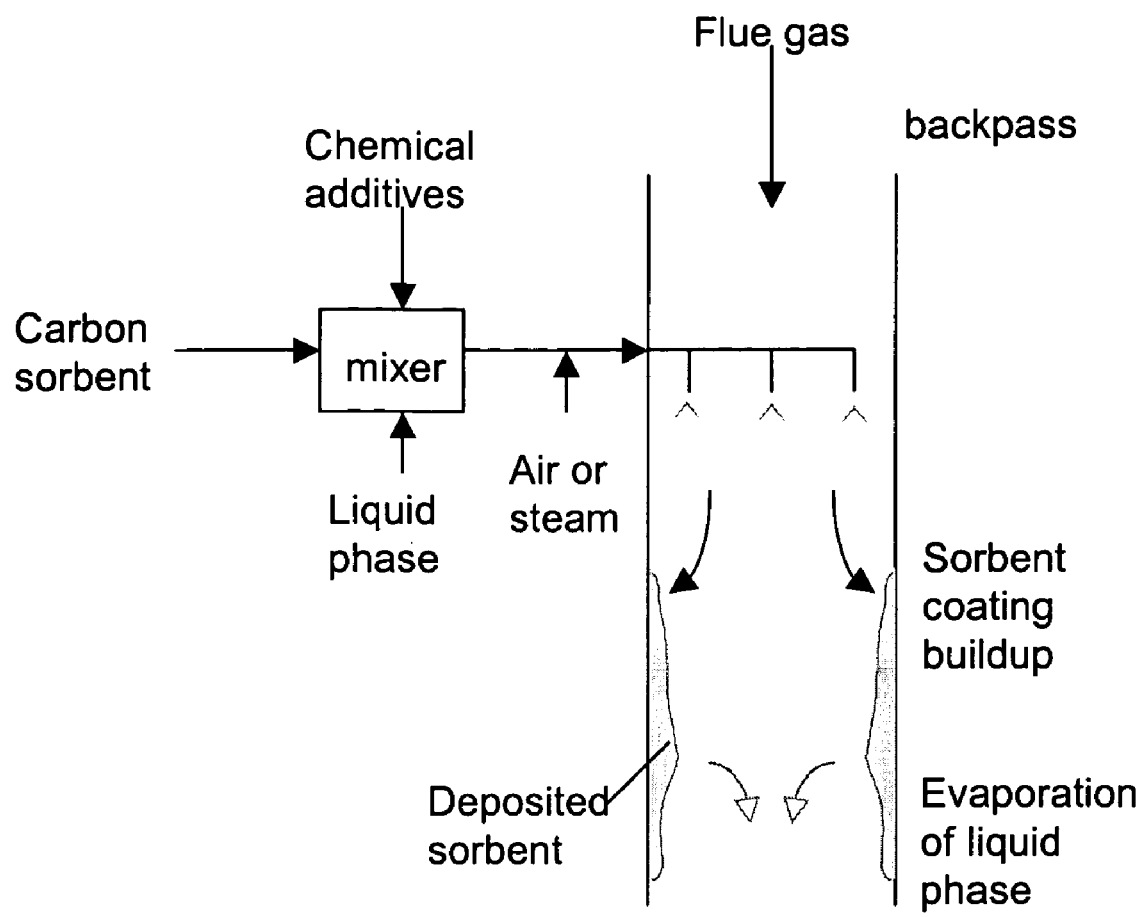
FIG. 17 is a schematic illustration of a slurry injection for enhanced sorbent deposition.

It can also be advantageous to prepare a slurry mixture of sorbent (solid phase), a liquid phase such as water, and/or other additives (either solid or liquid phase) that enhance mercury chemistry. The slurry is then, as seen in FIG. 17, atomized/sprayed into the flue gas, or directly onto surfaces of backpass devices. The liquid phase of the slurry enhances deposition onto backpass surfaces. As the liquid phase of the slurry evaporates, the residual phase (sorbent and/or additives) on the surfaces of backpass devices becomes exposed to flue gas for interaction with mercury.

Figure 18:
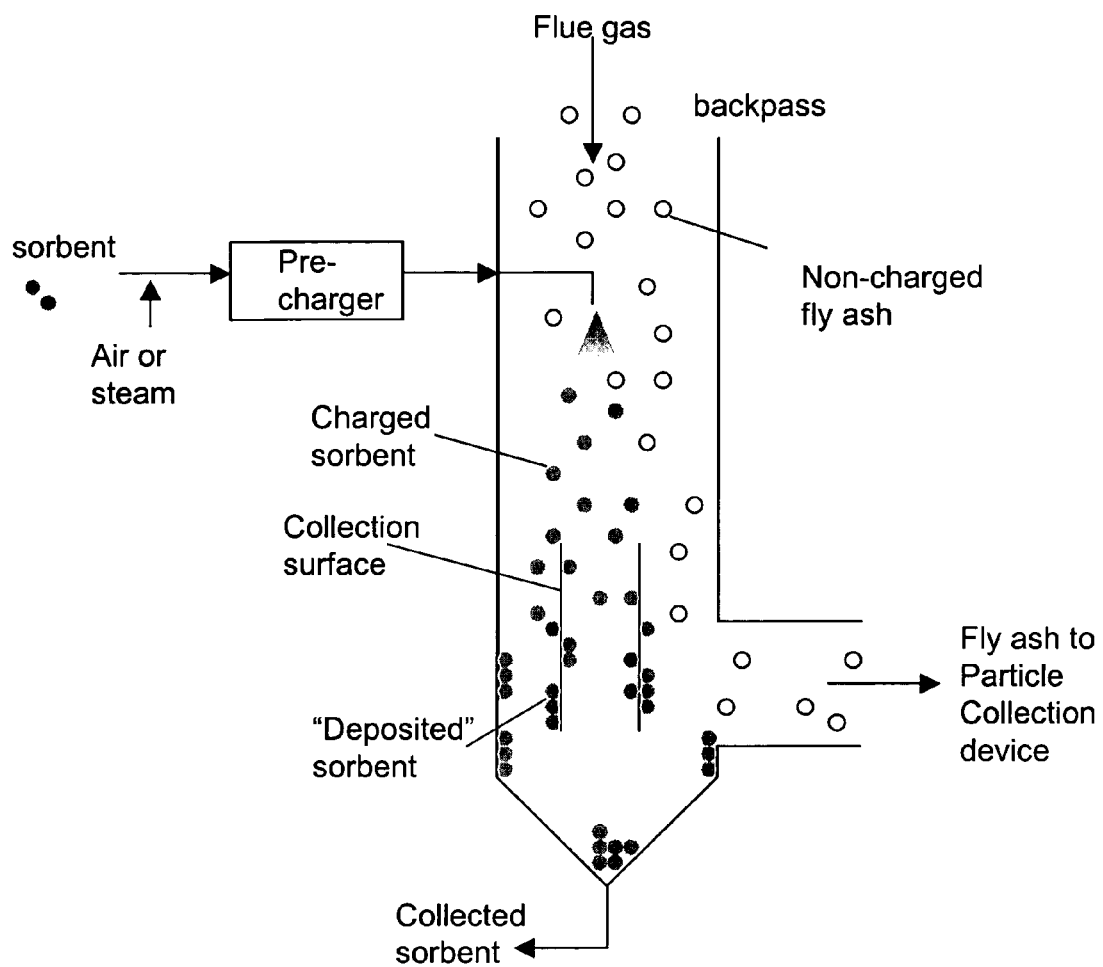
FIG. 18 is a schematic illustration of a precharging of sorbent particles.

Reference is had to FIG. 18 wherein another enhancement of the process is illustrated wherein the sorbent particles are electrically pre-charged before injection while, downstream of the sorbent injection location, there is provided oppositely charged (or ground) surfaces. The charged sorbent particles then preferentially adhere to these surfaces and interact with mercury for an extended period of time. This also allows selective separation of pre-charged sorbent particles from the non-charged fly ash stream, thereby avoiding any contamination of fly ash stream with sorbent and allowing fly ash utilization for concrete application.

Another way of avoiding (or minimizing) fly ash contamination while achieving mercury reduction is by injecting sorbent to air side or the neutral zone of rotary regenerative air heaters, rather than flue gas side. In a typical rotary regenerative heater, most of the fly ash particles (>90%) in flue gas pass through air heater. If sorbent particles are injected into flue gas upstream of rotary regenerative heater, most of the sorbent particles will pass through the air heater (in-flight sorbent particles) and only a small portion of the sorbent particles will deposit to the air heater elements (deposited sorbent particles). Most of the injected sorbent particles will participate in the mercury oxidation/capture process for only a short period of time, i.e., 0.01 to 30 seconds, and then end up in ash hoppers of an electrostatic precipitator (ESP) or a baghouse contaminating fly ash stream.

Figure 19:
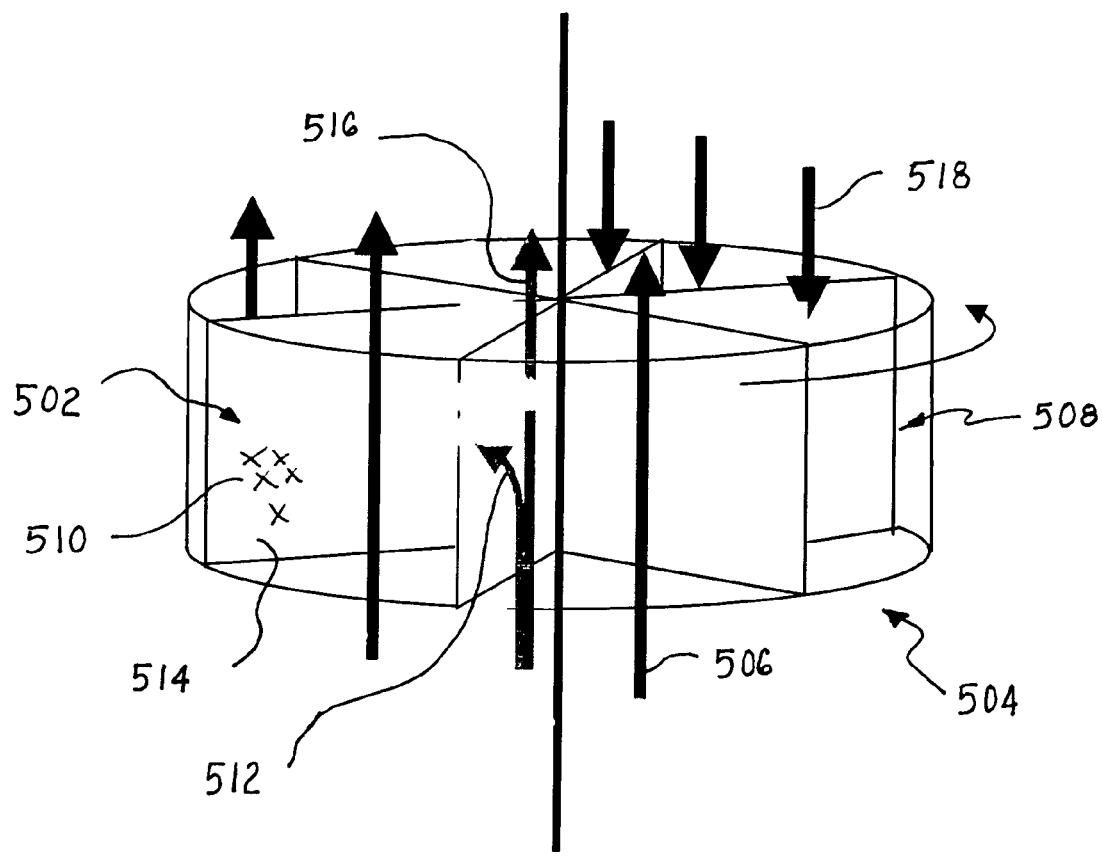
FIG. 19 is a perspective view of a small portion of the injected sorbent as it coats the air heater elements and of the balance of the sorbent particles as they are entrained by preheated air.

The contamination of fly ash in ash hoppers can be advantageously minimized by injecting sorbent to the upstream of the air side 502 of the air heater 504 (note that the sectors of this rotor of this rotary regenerative-type air heater cyclically rotate through the air side 502 into which fresh combustion air 506 and the flue gas side 508 into which flue gas flows) or directly into the neutral zone for coating the air heater elements with sorbent. As illustrated in FIG. 19, a small portion 510 of the injected sorbent 512 coats the air heater elements 514, and most of the sorbent particles are entrained by preheated air 516 and eventually end up in the high-temperature burner zone and burn away.

The sorbent-coated air heater elements 514 in the air-side 502 then rotate into the flue gas side 508 for mercury oxidation and capture. The deposited sorbent particles eventually are dislodged from the element surfaces by sootblowing, entrained by flue gas 518 and end up into the ash hoppers of an ESP or a baghouse. The amount of sorbent into the ash hoppers in this case, however, will be significantly less than that when sorbent is injected to the flue gas side. In this fashion, contamination of fly ash in the ash hoppers is significantly minimized.

The sorbent that passes through the air-side 502 of the air heater 504 is entrained into the boiler. As the carbonaceous sorbent burns away, any additives in the sorbent are released into flue gas. If the additives are halogen compounds such as chlorine, then the added halogen will participate in the mercury chemistry enhancing mercury oxidation and its capture.

Figure 23:
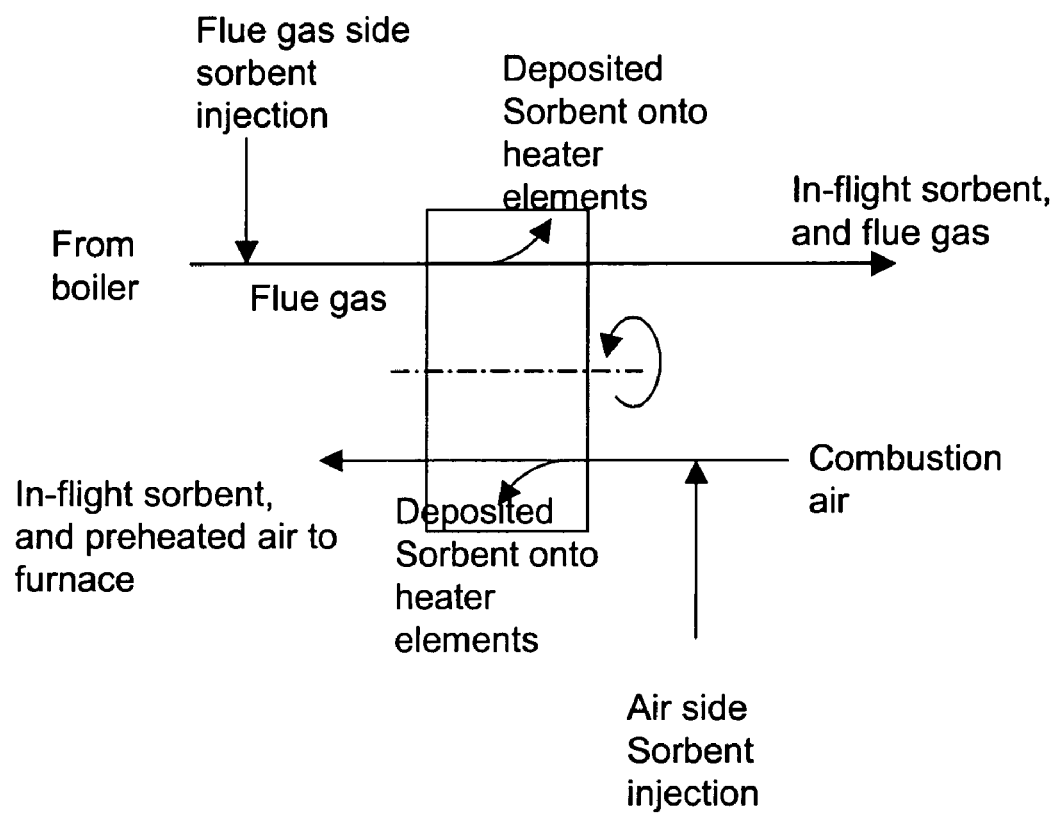
FIG. 23 is a schematic view of multiple sorbent injection for a rotary regenerative air heater.

Combinations of the air-side injection with the flue gas-side injection can be used as well for further control of mercury as is shown in FIG. 23.

The injection of sorbent to the air-side in accordance with the present invention offers a viable mercury control solution to plants with hot-side ESPs as well. A conventional way of mercury control for this configuration is to inject sorbents upstream of the ESP and capture them by the ESP. The technical difficulty in this control method is that the sorbents get to experience the high temperature zone for oxidation, but not the low temperature for mercury capture. The sorbents may participate in the oxidation of mercury but not its capture.

Figure 20:
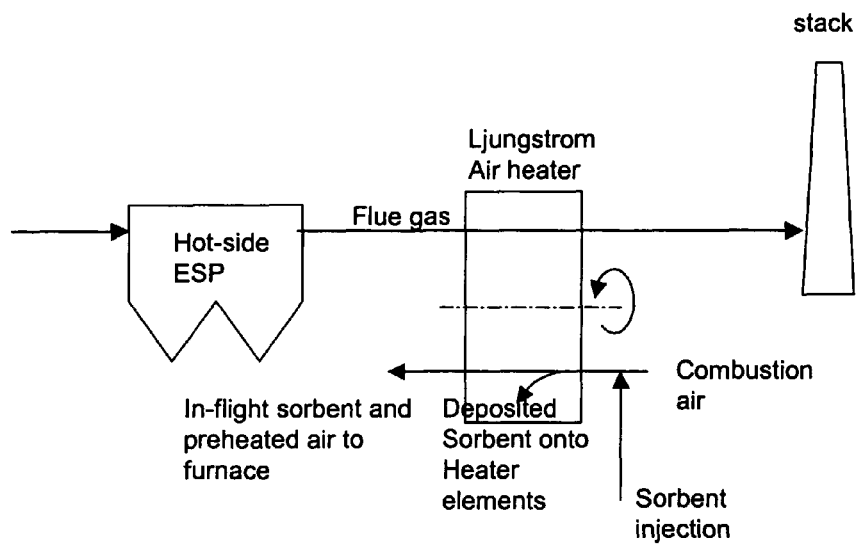
FIG. 20 is a schematic illustration of a combination of flue gas side injection with air-side injection helps control mercury for plant configurations with hot-side ESPs.

Sorbent injection to the air-side overcomes this difficulty. Air heaters are located in a temperature range where the kinetics for both oxidation and capture are fast. A combination of flue gas side injection with air-side injection helps control mercury for plant configurations with hot-side ESPs, as is shown in FIG. 20.

The rotation of the air heater elements at a constant speed makes the injection lance system for air-side injection of sorbent simpler than the one for flue gas side injection. The goal of air-side injection is to cover as much surface of air heater elements with sorbents as possible and as uniformly as possible. One may design an injection lance system that covers the whole cross section of the air sector. Since the air heater elements rotate at a constant speed between the flue gas duct and the air duct, however, one can achieve the goal with a simple injection system with a few injection lances extending from the air heater axis to the outer edge in a radial direction.

Figure 21:
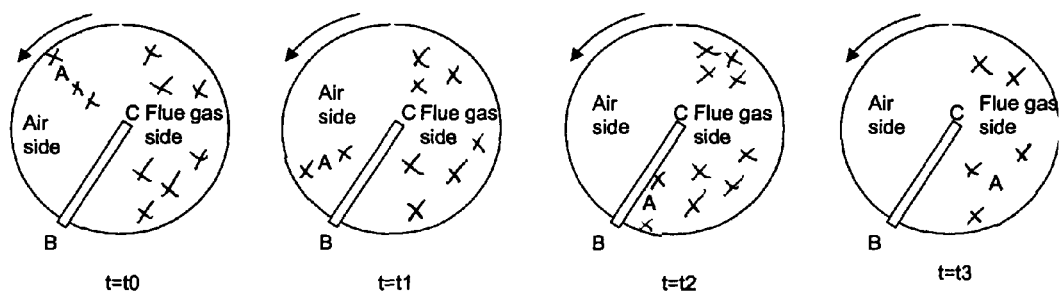
FIG. 21 is a schematic top plan view of the sequential operation of a sorbent injection lance system for a rotary regenerative air heater.

An example of the lance system is shown in FIG. 21, which is a schematic diagram of the injection of sorbent at the rotary regenerative air heater. Segments A, B, and C are the air-side of the rotary regenerative air heater, whereas D, E and F are the flue gas side. The air in A, B and C is flowing upwards whereas the flue gas in D, E and F is flowing downwards. The heater elements are rotating counterclockwise. In segment C, sorbent has been injected. Some of it is deposited to the heater element surfaces (shown with "x" cross-hatching) and most of it leaves the air heater along with the combustion air. The sorbent-coated heater element enters the flue gas side later and interacts with mercury in flue gas. In this fashion, the sorbent transferred to the flue gas side is only that deposited onto the surfaces.

Sorbent injection lance system for rotary regenerative air heaters. At time T0, air heater segment A is in the air-side of the heater. Injection lance BC is located in this case close to the inlet to the flue gas side as the heater elements rotate counterclockwise. Injection lance BC has multiple nozzles spraying sorbent into general area of line segment BC uniformly. A time t1, the segment A approaches the lance BC. At time t2, spraying sorbent to the segment A has been completed. Finally at time t3, segment A is rotating into the flue gas side. In this fashion, all of the air heater elements are coated with sorbent before they enter the flue gas side. The deposited sorbent on segment A interacts with mercury in flue gas. The flue gas flow is into the page, and the airflow is out of the pages.

Figure 22:
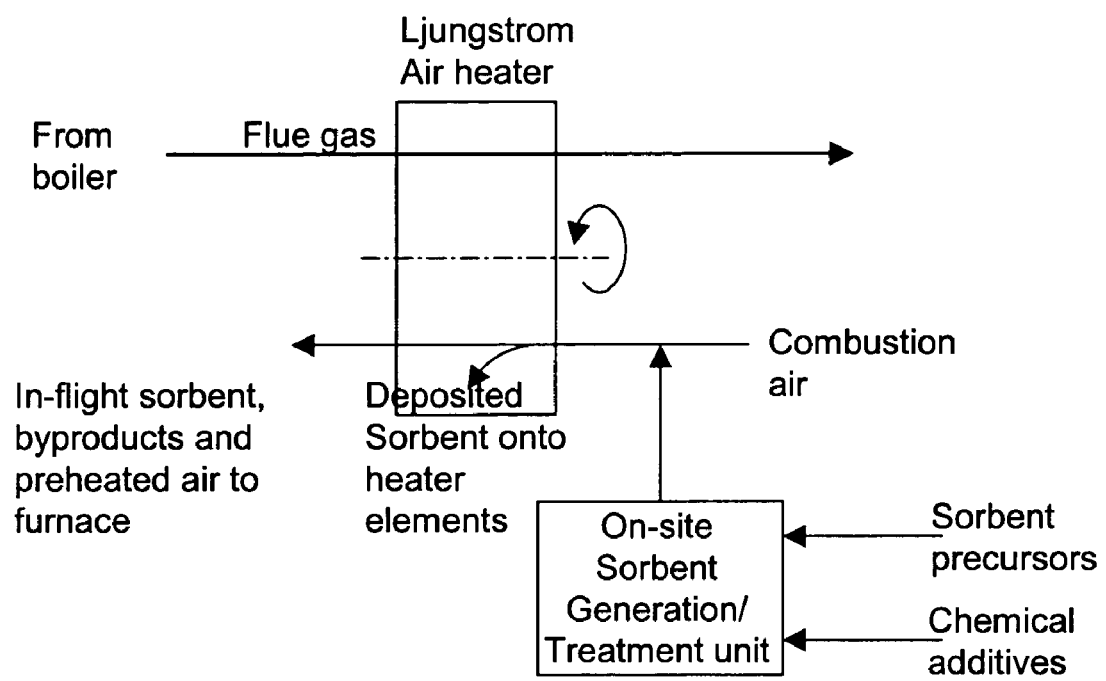
FIG. 22 is a schematic view of air-side injection of products from an on-site sorbent generation and treatment unit.

For various reasons, one may opt to generate and/or treat sorbent on site for mercury control. It may be advisable, in connection with the preparation of a small amount of sorbent on site, to ensure the proper environmental control of the undesirable byproducts for the sorbent preparation process. Incorporation of pollution control devices such as scrubbers or particulate control devices dedicated to the sorbent preparation unit makes the on site preparation less economical. A way of overcoming this on-site generation issue is to operatively connect the outlet of on-site generation unit to the upstream of the air-side rotary regenerative heater, as is shown in FIG. 22.

In an on-site generation process, sorbents are generated as well as undesirable byproducts. The byproducts in this case may be any unused additives, intermediate hydrocarbon material produced in the process, solvents or flue gases. As the output stream is directed to the air-side, some sorbents will be deposited onto the air heater element surfaces while the rest escapes the air heater. The escaping stream, which includes most of the byproducts, will be mixed with the combustion air ending up in the combustion zone of the boiler.

In this way, byproducts from the on-site generation unit undergo high-temperature destruction and are captured by the pollution control devices of the boiler system.

Thus, it can be understood that the present invention offers the advantages of lower sorbent consumption and costs when employed with an electrostatic precipitator (ESP) and a baghouse, the avoidance of high capital cost equipment (baghouse) downstream of existing ESP, the removal of mercury for cases where no inherent halogen is present in the flue gas (low chlorine fuels), the generation of inactive (lower-activity) carbon in fly ash leading to lower disposal costs and potential use in concrete, and the provision of a cost effective solution to plant configurations with hot-side ESPs.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method for removing mercury from the products of fuel conversion comprising:
   injecting activated carbon into contact with the products of fuel conversion at a contact location having a temperature between 400° F. and 1100° F., whereupon the activated carbon adsorbs mercury; and removing the activated carbon having mercury adsorbed thereon at a collection location, wherein a temperature at the collection location is configured in correspondence with the respective contact location temperature such that, during the time at which the activated carbon and the flue gas are in contact with one another while traveling between the contact location and the collection location, an exposure temperature deviation during this time, which is the difference in temperature between the respective temperature at the contact location and the respective temperature at the collection location, is greater than 50° F., whereupon, in correspondence with the respective temperature at the contact location that lies in the range between 400° F. and 1100° F., the respective collection location temperature is a value at least 50° F. less than the respective contact location temperature, and wherein the products of fuel conversion are traveled through an air heater to effect transfer of heat from the products of fuel conversion to an air stream and injecting the activated carbon into contact with the products of fuel conversion at a contact location includes injecting the activated carbon upstream of the flue gas side of the air heater.

2. A method according to claim 1, wherein injecting the activated carbon into contact with the products of fuel conversion at a contact location having a temperature between 400° F. and 1100° F. includes injecting the activated carbon into contact with the products of fuel conversion at a contact location having a temperature between 500° F. and 900° F.

3. A method according to claim 1, wherein injecting the activated carbon into contact with the products of fuel conversion at a contact location having a temperature between 400° F. and 1100° F. includes injecting the activated carbon into contact with the products of fuel conversion at a contact location having a temperature between 550° F. and 750° F.

4. A method according to claim 1, and further comprising depositing at least one of a halogen species and an acidic species on the activated carbon prior to injecting the activated carbon into contact with the products of fuel conversion.

5. A method according to claim 1, wherein the products of fuel conversion include fly ash generated by the combustion of coal and removing the activated carbon having mercury adsorbed thereon includes separating activated carbon which has absorbed mercury from the products of fuel conversion by subjecting the products of fuel conversion to a classification process operable to separate the activated carbon from relatively coarser and denser fly ash.

6. A method according to claim 1, wherein the products of fuel conversion include flue gases generated by the combustion of coal and the activated carbon adsorbs at least one of elemental mercury and mercury compounds from the flue gases.

7. A method according to claim 1, wherein the respective collection temperature is configured in correspondence with the respective temperature at the contact location to be a value between 100 to 800° F.

8. A method according to claim 1, wherein the respective collection temperature is configured in correspondence with the respective temperature at the contact location to be a value between 120 to 400° F.

9. A method according to claim 1, wherein the respective collection temperature is configured in correspondence with the respective temperature at the contact location to be a value between 140 to 300° F.

10. A method according to claim 1, wherein the collection location temperature is configured in correspondence with the respective contact location temperature such that, during the time at which the activated carbon and the flue gas are in contact with one another while traveling between the contact location and the collection location, the exposure temperature deviation during this time, which is the difference in temperature between the respective temperature at the contact location and the respective temperature at the collection location, is greater than 100° F., whereupon, in correspondence with the respective temperature at the contact location that lies in the range between 400° F. and 1100° F., the respective collection location temperature is a value at least 100° F. less than the respective contact location temperature.

11. A method according to claim 1, wherein the collection location temperature is configured in correspondence with the respective contact location temperature such that, during the time at which the activated carbon and the flue gas are in contact with one another while traveling between the contact location and the collection location, the exposure temperature deviation during this time, which is the difference in temperature between the respective temperature at the contact location and the respective temperature at the collection location, is greater than 200° F., whereupon, in correspondence with the respective temperature at the contact location that lies in the range between 400° F. and 1100° F., the respective collection location temperature is a value at least 200° F. less than the respective contact location temperature.

12. A method according to claim 1, and further comprising modifying at least one of the surface of the activated carbon and a surface along the path between the contact location and the collection location to thereby enhance the deposition of the activated carbon on a surface along the path between the contact location and the collection location during which the activated carbon and the flue gas are in contact with one another.

13. A method according to claim 12, wherein modifying at least one of the surface of the activated carbon and a surface along the path between the contact location and the collection location includes treating the activated carbon with an additive to increase the stickiness of the activated carbon.

14. A method according to claim 13, wherein treating the activated carbon with an additive to increase the stickiness of the activated carbon includes treating the activated carbon with at least one of: ammonium halide and ammonium bromide.

15. A method according to claim 12, wherein modifying at least one of the surface of the activated carbon and a surface along the path between the contact location and the collection location includes imparting an increased electrical charge to the activated carbon.

16. A method according to claim 1, wherein the products of fuel conversion are traveled through an air heater to effect transfer of heat from the products of fuel conversion to an air stream and injecting the activated carbon into contact with the products of fuel conversion at a contact location includes injecting the activated carbon both upstream of the air side of the air heater and upstream of the flue gas side of the air heater.

17. A method according to claim 1, wherein injecting the activated carbon into contact with the products of fuel conversion includes injecting the activated carbon into contact with the products of fuel conversion at a contact location having a temperature between about 600° F. and 800° F.

18. A method according to claim 17, wherein the respective collection location temperature is between 220° F. and 370° F.

19. A method for removing mercury from the products of fuel conversion comprising:
  disposing activated carbon into contact with the products of fuel conversion at a contact location having a temperature between 400° F. and 1100° F., whereupon the activated carbon adsorbs mercury; and
  removing the activated carbon having mercury adsorbed thereon, wherein the products of fuel conversion include fly ash generated by the combustion of coal and removing the activated carbon having mercury adsorbed thereon includes separating activated carbon which has adsorbed mercury from the products of fuel conversion by subjecting the products of fuel conversion to a classification process operable to separate activated carbon from relatively coarser and denser fly ash.

20. A method for removing mercury from the products of fuel conversion comprising:
  disposing a carbonaceous sorbent into contact with the products of fuel conversion at a contact location having a temperature between 400° F. and 1100° F., whereupon the carbonaceous sorbent adsorbs mercury;
  removing the carbonaceous sorbent having mercury adsorbed thereon at a collection location having a temperature between 400° F. and 1100° F., wherein the sorbent collection temperature is configured in correspondence with the respective contact location temperature such that, during the time at which the sorbent and the flue gas are in contact with one another while traveling between the contact location and the collection location, the exposure temperature deviation during this time, which is the difference in temperature between the respective temperature at the contact location and the respective temperature at the collection location, is greater than 50° F. and the respective collection temperature is a value at least 50° F. less than the respective contact location temperature; and
  modifying at least one of the surface of the carbonaceous sorbent and a surface along the path between the contact location and the collection location to thereby enhance the deposition of the carbonaceous sorbent on a surface along the path between the contact location and the collection location during which the sorbent and the flue gas are in contact with one another, wherein modifying at least one of the surface of the carbonaceous sorbent and a surface along the path between the contact location and the collection location includes treating the carbonaceous sorbent with an additive to increase the stickiness of the carbonaceous sorbent.

21. A method according to claim 20, wherein treating the carbonaceous sorbent with an additive to increase the stickiness of the carbonaceous sorbent includes treating the carbonaceous sorbent with at least one of: ammonium halide and ammonium bromide.

22. A method for removing mercury from the products of fuel conversion comprising:
  disposing activated carbon into contact with the products of fuel conversion at a contact location having a temperature between 400° F. and 1100° F., whereupon the activated carbon adsorbs mercury; and
  removing the activated carbon having mercury adsorbed thereon at a collection location, wherein a temperature at the collection location is configured in correspondence with the respective contact location temperature such that, during the time at which the activated carbon and the flue gas are in contact with one another while traveling between the contact location and the collection location, an exposure temperature deviation during this time, which is the difference in temperature between the respective temperature at the contact location and the respective temperature at the collection location, is greater than 50° F., whereupon, in correspondence with the respective temperature at the contact location that lies in the range between 400° F. and 1100° F., the respective collection location temperature is a value at least 50° F. less than the respective contact location temperature, and wherein the products of fuel conversion are traveled through an air heater to effect transfer of heat from the products of fuel conversion to an air stream and disposing the activated carbon into contact with the products of fuel conversion at a contact location includes injecting the activated carbon upstream of the air side of the air heater.

* * * * *

EX PARTE REEXAMINATION CERTIFICATE (10338th)

United States Patent
Srinivasachar et al.

(10) Number: US 8,069,797 C1
(45) Certificate Issued: Oct. 16, 2014

(54) CONTROL OF MERCURY EMISSIONS FROM SOLID FUEL COMBUSTION

(75) Inventors: Srivats Srinivasachar, Sturbridge, MA (US); Shin G. Kang, Simsbury, CT (US); Kurt W. Johnson, East Windsor, CT (US)

(73) Assignee: ALSTOM Technology Ltd, Baden (SE)

Reexamination Request:
No. 90/012,925, Jul. 23, 2013

Reexamination Certificate for:
Patent No.: 8,069,797
Issued: Dec. 6, 2011
Appl. No.: 10/961,697
Filed: Oct. 8, 2004

Related U.S. Application Data

(63) Continuation-in-part of application No. 10/453,140, filed on Jun. 3, 2003, now Pat. No. 6,848,374.

(51) Int. Cl.
*F23J 11/00* (2006.01)

(52) U.S. Cl.
USPC .......................................... 110/345; 110/342

(58) Field of Classification Search
None
See application file for complete search history.

(56) References Cited

To view the complete listing of prior art documents cited during the proceeding for Reexamination Control Number 90/012,925, please refer to the USPTO's public Patent Application Information Retrieval (PAIR) system under the Display References tab.

*Primary Examiner* — Jerry D Johnson

(57) ABSTRACT

A system 26 for removing elemental mercury or mercury compounds handles carbonaceous sorbent 28 of a starter batch stored in a silo 30 in an agglomerated state. The sorbent 28 is fed by a feeder 32 to a separation device 34, which comminutes (if necessary) and de-agglomerates the sorbent particles 28 to their primary size distribution. This device 34 may be a particle-particle separator or a jet mill, where compressed air or high-pressure steam is the energy source. The de-agglomerated sorbent 28 of a contact batch created from the starter batch is conveyed by an airsteam for injection at a contact location 66 in a flue gas duct whereat carbonaceous sorbent of the contact batch adsorbs mercury from the flue gas.

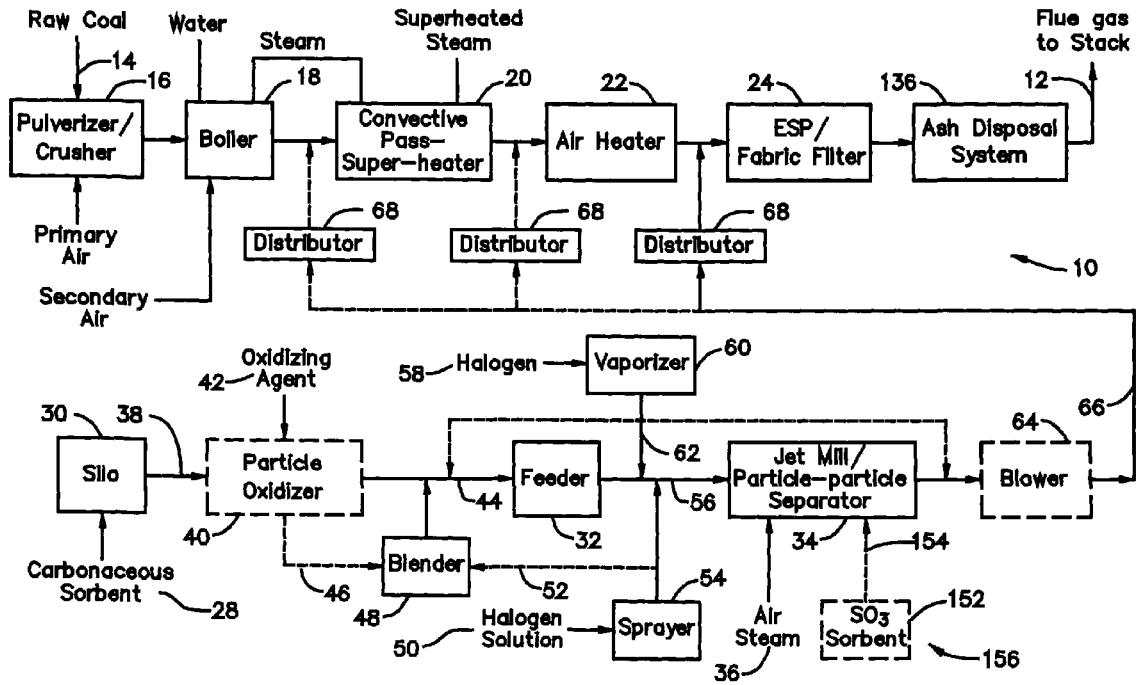

US 8,069,797 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-18 and 20-22 is confirmed.

Claim 19 is cancelled.

New claims 23-51 are added and determined to be patentable.

*23. The method of claim 1, wherein the products of fuel conversion include flue gas generated by the combustion of coal and the contact location has a temperature between 500° F. and 900° F.*

*24. The method of claim 23, wherein the contact location has a temperature between 550° F. and 750° F.*

*25. The method of claim 24, wherein the exposure temperature deviation is greater than 100° F.*

*26. The method of claim 25, wherein the exposure temperature deviation is greater than 200° F.*

*27. The method of claim 25, wherein the activated carbon is untreated activated carbon.*

*28. The method of claim 25, further comprising treating the activated carbon with at least one of a halogen, halide, $H_2SO_4$, and $H_3PO_4$.*

*29. The method of claim 25, further comprising contacting the activated carbon with an oxidizing agent prior to injecting the activated carbon into contact with the products of fuel conversion.*

*30. The method of claim 25, wherein injecting the activated carbon includes injecting activated carbon having a particle size distribution, such that 50% of the particles by mass of the injected activated carbon have a diameter less than 8 microns.*

*31. The method of claim 25, further comprising de-agglomerating the activated carbon before injecting the activated carbon.*

*32. The method of claim 30, wherein at least one of high pressure fluid or compressed air is used to de-agglomerate the activated carbon before injecting the activated carbon.*

*33. A method for removing mercury from the products of fuel conversion, wherein the products of fuel conversion include flue gas generated by the combustion of coal, the method comprising:*

*injecting activated carbon into contact with the products of fuel conversion at a contact location having a temperature between 600° F. and 800° F., whereupon the activated carbon adsorbs mercury; and*

*removing the activated carbon having mercury adsorbed thereon at a collection location, wherein a temperature at the collection location is configured to be less than the contact location temperature, such that, during the time at which the activated carbon and the flue gas are in contact with one another while traveling between the contact location and the collection location, the flue gas temperature during this time decreases from between 600° F. and 800° F. at the contact location to a temperature having a value between 220° F. and 370° F. at the collection location; and*

*wherein the products of fuel conversion are traveled through an air heater to effect transfer of heat from the products of fuel conversion to an air stream and injecting the activated carbon into contact with the products of fuel conversion at a contact location includes injecting the activated carbon upstream of the flue gas side of the air heater and wherein the activated carbon is traveled through the air heater before the activated carbon is removed at the collection location.*

*34. The method of claim 33, wherein the activated carbon is untreated activated carbon.*

*35. The method of claim 33, further comprising treating the activated carbon with at least one of a halogen, halide, $H_2SO_4$, and $H_3PO_4$.*

*36. The method of claim 33, further comprising contacting the activated carbon with an oxidizing agent prior to injecting the activated carbon into contact with the products of fuel conversion.*

*37. The method of claim 33, further comprising depositing at least one of a halogen, halogen acid, and a halide salt on the activated carbon prior to injecting the activated carbon into contact with the products of fuel conversion.*

*38. The method of claim 37, wherein depositing a halogen on the activated carbon prior to injecting the activated carbon into contact with the products of fuel conversion consists of spraying a solution containing a halogen on the surface of the activated carbon particles.*

*39. The method of claim 33, wherein injecting the activated carbon includes injecting activated carbon having a particle size distribution, such that 50% of the particles by mass of the injected activated carbon have a diameter less than 8 microns.*

*40. The method of claim 33, further comprising de-agglomerating the activated carbon before injecting the activated carbon.*

*41. The method of claim 40, wherein at least one of high pressure fluid or compressed air is used to de-agglomerate the activated carbon before injecting the activated carbon.*

*42. A method for removing mercury from the products of fuel conversion, wherein the products of fuel conversion include flue gas generated by the combustion of coal, the method comprising:*

*oxidizing mercury by injecting activated carbon into contact with the products of fuel conversion at a contact location having a temperature between 500° F. and 900° F., whereupon the activated carbon adsorbs mercury, wherein the contact location is upstream of the flue gas side of an air heater, and wherein the products of fuel conversion are traveled through the air heater in order to effect transfer of heat from the products of fuel conversion to an air stream;*

*removing the activated carbon having mercury adsorbed thereon at a collection location, wherein a temperature at the collection location is configured in correspondence with the respective contact location temperature such that, during the time at which the activated carbon and the flue gas are in contact with one another while traveling between the contact location and the collection location and through the air heater, an exposure temperature deviation during this time, which is the difference in temperature between the respective temperature at the contact location and the respective temperature at the collection location, is greater than 100° F.*

43. The method of claim 42, wherein the contact location has a temperature between 550° F. and 750° F.

44. The method of claim 42, wherein the contact location has a temperature between 600° F. and 800° F.

45. The method of claim 42, wherein the respective collection location temperature is between 220° F. and 370° F.

46. The method of claim 42, wherein the exposure temperature deviation is greater than 200° F.

47. The method of claim 42, wherein the activated carbon is untreated activated carbon.

48. The method of claim 42, further comprising treating the activated carbon with at least one of a halogen, halide, $H_2SO_4$, and $H_3PO_4$.

49. The method of claim 42, further comprising contacting the activated carbon with an oxidizing agent prior to injecting the activated carbon into contact with the products of fuel conversion.

50. The method of claim 42, wherein injecting the activated carbon includes injecting activated carbon having a particle size distribution, such that 50% of the particles by mass of the injected activated carbon have a diameter less than 8 microns.

51. The method of claim 42, further comprising de-agglomerating the activated carbon before injecting the activated carbon.

\* \* \* \* \*